(12) United States Patent
Weed et al.

(10) Patent No.: US 7,954,627 B2
(45) Date of Patent: Jun. 7, 2011

(54) BIN TRANSPORTER SYSTEM

(75) Inventors: Brian C. Weed, Gloucester, MA (US);
Steven D. Weed, Marblehead, MA (US);
Allan D. Weed, Marblehead, MA (US)

(73) Assignee: BTSystems, LLC, Beverly, MA (US)

( * ) Notice: Subject to any disclaimer, the term of this patent is extended or adjusted under 35 U.S.C. 154(b) by 502 days.

(21) Appl. No.: 12/052,110

(22) Filed: Mar. 20, 2008

(65) Prior Publication Data

US 2008/0232938 A1  Sep. 25, 2008

Related U.S. Application Data

(60) Provisional application No. 60/896,519, filed on Mar. 23, 2007.

(51) Int. Cl.
*B65G 37/00* (2006.01)

(52) U.S. Cl. ......... 198/580; 198/562; 193/35 R; 193/37; 118/729

(58) Field of Classification Search .......... 198/561, 198/562, 580, 550.3, 860.1; 193/35 R, 35 C; 414/222.11; 209/911; 118/729
See application file for complete search history.

(56) References Cited

U.S. PATENT DOCUMENTS

| | | | | |
|---|---|---|---|---|
| 3,744,610 A * | 7/1973 | Tabler | ................... | 193/35 R |
| 4,890,714 A * | 1/1990 | Brown | ................... | 193/35 R |
| 5,478,398 A * | 12/1995 | Nakanishi et al. | ............ | 118/726 |
| 6,502,408 B1 * | 1/2003 | Corcoran | ................... | 62/63 |
| 7,025,195 B2 * | 4/2006 | Brixius et al. | ................ | 198/787 |
| 7,316,305 B2 * | 1/2008 | Richter et al. | ............... | 193/35 A |
| 7,641,035 B2 * | 1/2010 | Lee et al. | ................. | 193/37 |
| 7,678,198 B2 * | 3/2010 | Hartig | ................. | 118/729 |
| 7,686,154 B2 * | 3/2010 | Henkel et al. | ................. | 198/358 |
| 2003/0128806 A1 * | 7/2003 | Morrell | ................. | 378/57 |
| 2004/0074738 A1 * | 4/2004 | Brixius et al. | ........... | 198/370.04 |
| 2004/0135044 A1 * | 7/2004 | Radermacher | ............. | 193/35 R |
| 2005/0247540 A1 * | 11/2005 | Brannon | ................. | 198/346 |

\* cited by examiner

*Primary Examiner* — James R Bidwell

(74) *Attorney, Agent, or Firm* — McCormick, Paulding & Huber LLP

(57) ABSTRACT

A bin transporter system is used for moving bins or trays from the exit end of a security checkpoint conveyor to the entrance end of the conveyor. The system includes one or more support stands and a roller assembly attached to the stands. The roller assembly includes an elongate bin guide and roller conveyors attached to the inside of the bin guide. The roller assembly is held in a longitudinally inclined orientation, for gravity-actuated movement of the bin along the bin guide, as facilitated by the roller conveyors. Additionally, when bins are placed in the bin guide against the roller conveyors for movement along the bin guide, the bins lie at a laterally tilted orientation, either generally horizontally or generally vertically. This prevents the bins from falling out the front of the roller assembly, in cases where the bin guide has an open front portion.

20 Claims, 22 Drawing Sheets

FIG. 6H  FIG. 6I

BIN TRANSPORTER SYSTEM

CROSS REFERENCE TO RELATED APPLICATION

This application claims the benefit of U.S. Provisional Application Ser. No. 60/896,519 filed Mar. 23, 2007, which is incorporated by reference herein in its entirety.

FIELD OF THE INVENTION

The present invention relates to conveyor assemblies and, more particularly, to gravity-actuated rollerways for conveying items from one location to another.

BACKGROUND OF THE INVENTION

At airports and other secure locations, passengers and other persons desiring to enter a secure area are oftentimes directed through a security checkpoint. Such checkpoints typically include a portal-type metal detector for screening passengers, and an x-ray or other imaging machine for screening carry-on luggage, coats, shoes, and the like. The x-ray machine includes a covered conveyor belt, an x-ray or other imaging device positioned above (or otherwise near) the conveyor belt, an operator station, and a conveyor egress ramp or shoot. In operation, passengers place carry-on luggage and other items on the lead end of the conveyor belt. The belt is controlled for moving the items under the imaging device, whose output is displayed on a monitor for operator inspection. Once the items pass the imaging device, they are outputted to the egress ramp, for passengers to retrieve their belongings.

Although luggage items are sized for safe conveyance through the x-ray machine conveyor belt, certain items, especially loose items such as purses, jackets, shoes, belts, watches, cell phones, and wallets, may get hung up in the machine. Accordingly, most security checkpoints provide passengers with small, open-topped plastic bins or trays for depositing loose or small items. Such bins are typically rectangular, slightly smaller in width than the conveyor belt, and with a height of around five to six inches. In operation, stacks of the bins are placed near the conveyor entrance. Passengers deposit items into the bins, which are then moved along the conveyor for scanning. At the exit end of the conveyor, after passengers retrieve their possessions, the empty bins are stacked together, and hauled back to the conveyor entrance by security personnel.

Especially during very busy times, it may be the case that a number of bins are used in rapid succession. As a result, instead of concentrating their efforts on security matters, security personnel are required to spend time shuttling empty bins back to the head of the security checkpoint conveyor belt. Being thusly preoccupied, the chances of a security breach may be increased.

Still further, it has been documented that security personnel may become injured during the process of moving large numbers of bins back and forth between their operable positions.

With the forgoing problems and concerns in mind, it is the general object of the present invention to provide a bin transporter system which addresses these known drawbacks and problems.

SUMMARY OF THE INVENTION

To overcome these and other disadvantages, an embodiment of the present invention relates to a bin transporter system for moving bins or trays from one location to another, e.g., from the exit end of a security checkpoint conveyor system to the entrance end of the conveyor system. The bin transporter system includes one or more support stands or other supports and a roller assembly attached to the supports. The roller assembly accommodates a bin or tray, e.g., such as those used at a security checkpoint, and includes an elongate bin guide and first and second roller conveyors attached to the inside of the bin guide. The roller assembly is supported by the support stands in a longitudinally inclined orientation, for gravity-actuated movement of the bin along the bin guide. The roller conveyors are cooperatively positioned for facilitating movement of a bin along the bin guide in this manner. Additionally, when a bin is placed in the bin guide against the roller conveyors for movement along the bin guide, the bin lies at a laterally tilted orientation, either generally horizontally or generally vertically, i.e., the bin is either generally vertically or horizontally oriented, but tilted back slightly. This prevents the bins from falling out the front of the roller assembly, in cases where the bin guide includes an open front portion for facilitating loading and unloading of bins from the roller assembly.

As should be appreciated, "roller conveyor" refers to any device presenting a rolling surface for contact with a bin in the bin guide. Examples include wheel rollers, cylindrical rollers, ball- or sphere-type rollers or conveyors, miniature wheel-type rollers (i.e., skate wheel conveyors), and the like.

In another embodiment, the bin transporter system includes a plurality of free-standing support stands, with the roller assembly being supported by and extending between the support stands. This obviates the need to attach the roller assembly to a security checkpoint conveyor system, which may be prohibited by security regulations.

In another embodiment, the roller assembly is reversible on the support stands, between first and second positions or orientations. In the first position, a bin positioned against the roller conveyors (for movement along the bin guide) is laterally titled in a generally horizontal orientation. That is, the bin is generally horizontally oriented, with the open top of the bin being generally parallel to the floor or other support surface, but laterally tilted back off of horizontal for maintaining the bin in the bin guide as it travels along the roller conveyors. In the second position/orientation of the roller assembly, a bin positioned against the roller conveyors lies laterally titled in a generally vertical orientation. This is, the bin is generally vertically oriented in the bin guide, with the open top of the bin being generally perpendicular to the floor, but laterally tilted back off of vertical for maintaining the bin in the bin guide as it travels along the roller conveyors. In either position of the roller assembly, be it for vertical or horizontal bin transport, the roller assembly is securely attached to the support stands prior to use.

BRIEF DESCRIPTION OF THE DRAWINGS

The present invention will be better understood from reading the following description of non-limiting embodiments, wherein below:

FIGS. 6H-6J are perspective views of a means for attaching to adjacent sections of roller system assembly to one another;

DETAILED DESCRIPTION OF THE PREFERRED EMBODIMENTS

Figure 1:
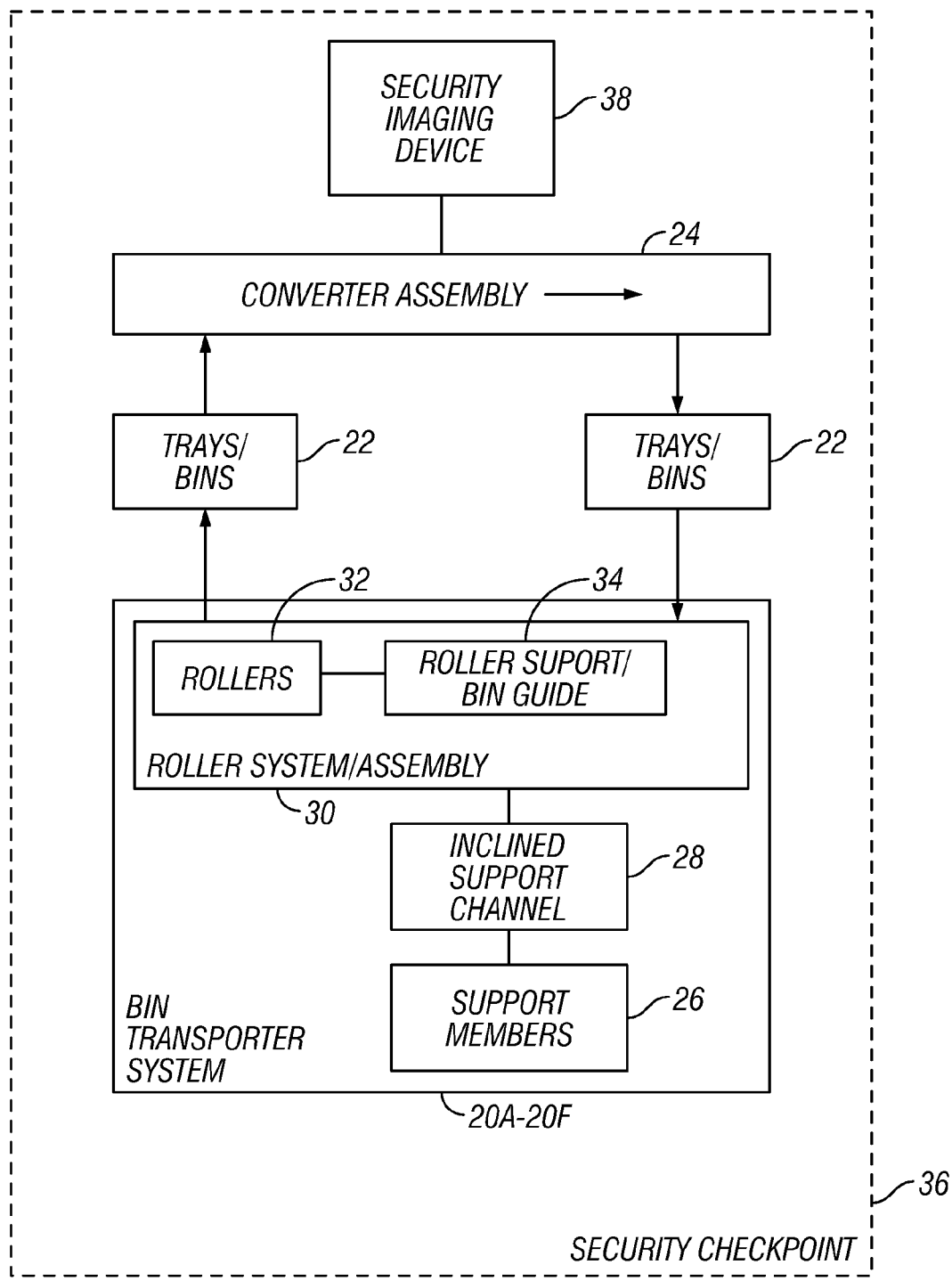
FIG. 1 is a schematic diagram of a bin transporter system according to an embodiment of the present invention.

With reference to FIG. 1 in overview, various embodiments of the present invention relate to a bin transporter system 20A-20F for use in moving bins or trays 22 from a first location to a second location, e.g., from the exit end of a conveyor system 24 to the entrance of the conveyor system. The bin transporter system 20A-20F includes one or more support members 26, an elongate support channel assembly 28 attached to and supported by the support members in a generally horizontal orientation, and an elongate roller system or assembly 30 attached to and supported by the support channel assembly. (Certain embodiments lack a support channel assembly 28.) The roller system assembly 30 includes a plurality of roller units 32 attached to a roller support bin guide 34, which is longitudinally inclined at a slight angle for gravity-actuated movement of the bins 22 along the roller units 32 and down the length of the roller assembly 30. In operation, an empty bin 22 is placed in the bin guide 34 against the roller units 32, at the upper end of the roller assembly 30. Since the roller assembly 30 is longitudinally inclined, the bin 22 rolls down to the lower end of the roller assembly 30, where it may be removed for re-use in sending items along the conveyor system 24.

Figure 2A:
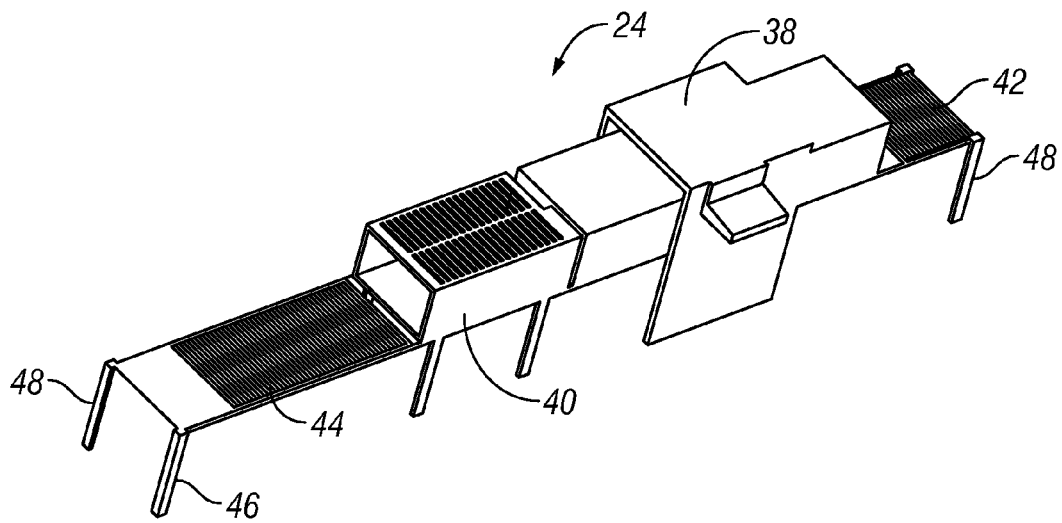
FIG. 2A is a perspective view of a security checkpoint conveyor system.
Figure 2B:
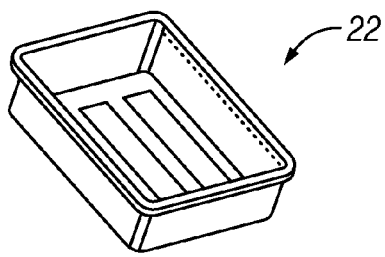
FIG. 2B is a perspective view of a typical bin or tray used to convey loose items in a security checkpoint conveyor system.

Although the bin transporter system 20A-20F may be used in any situation where it is desired to move bins or trays 22 from one location to another, the system 20A-20F is primarily illustrated herein as implemented for use at a transportation security checkpoint 36. As shown in FIGS. 2A and 2B, security checkpoints typically include a conveyor assembly 24 for moving bins or trays 22 under an x-ray machine or other security imaging device 38. As indicated, the conveyor assembly 24 may include a covered conveyor belt 40, a lead or entry table or platform 42 for staging items at the entrance of the covered conveyor belt 40, and an inclined egress ramp or shoot 44 onto which items are deposited for pickup once they leave the conveyor belt 40 after scanning. The conveyor belt 40, entry table 42, and egress shoot 44 are supported above the floor 46 or other support surface by one or more conveyor support legs or other support members 48.

In one embodiment, the bin transporter system 20A-20F is configured to accommodate Rubbermaid® bins item #3349, which is a common type of bin used at transportation security checkpoints.

Figure 3E:
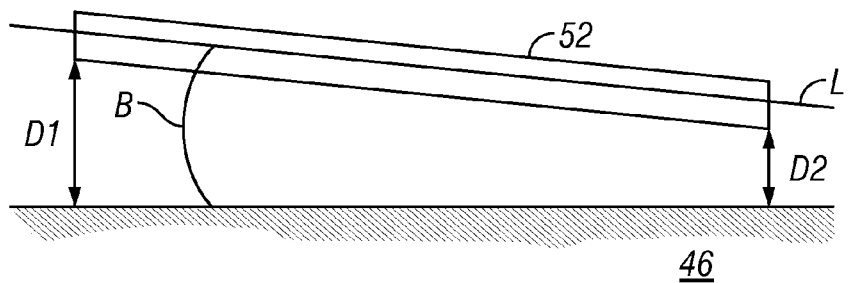
FIG. 3E is a schematic view of the channel assembly in a longitudinally inclined orientation.
Figure 3F:
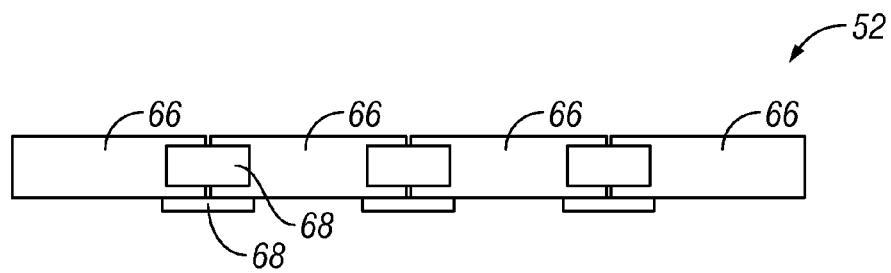
FIG. 3F is a side elevation view of an additional embodiment of the channel assembly.
Figure 3A:
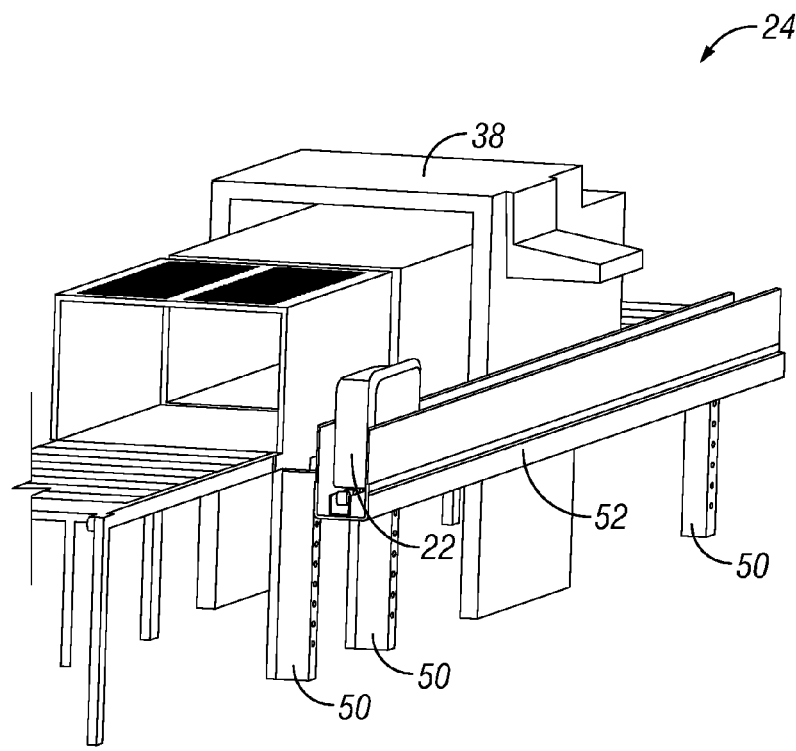
FIG. 3A is a perspective view of the bin transporter system according to a first embodiment of the present invention.

FIGS. 3A-3H are detailed views of a first embodiment of the bin transporter system 20A. In this embodiment, as shown in FIG. 3A, the bin transporter system 20A includes a plurality of support legs 50, a support channel assembly 52, and a roller system assembly 54. The bin transporter system 20A is attached to the side of a security checkpoint conveyor system 24, for gravity-actuated movement of bins or trays 22 between the exit and entrance ends of the conveyor system 24.

Figure 3C:
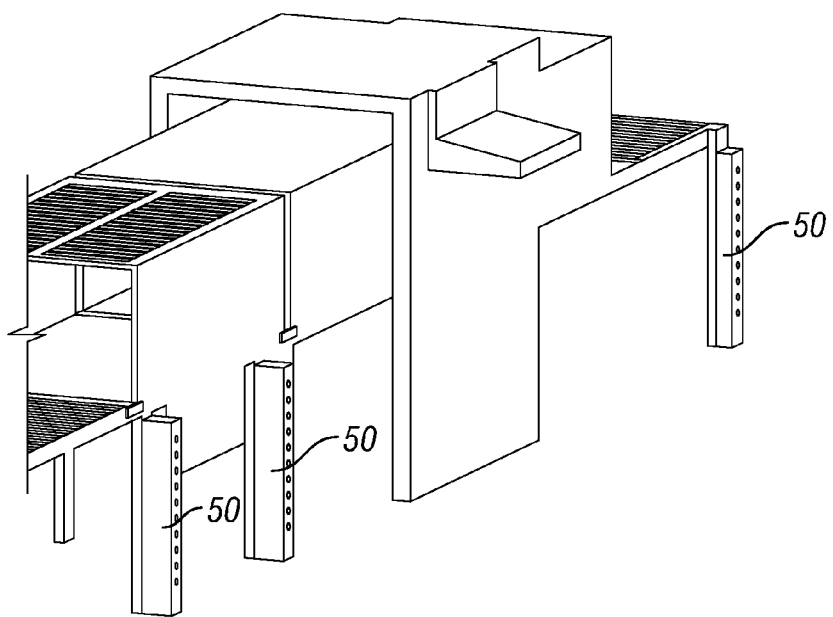
FIG. 3C is a perspective view of several support legs attached to the side of a security checkpoint conveyor system.
Figure 3B:
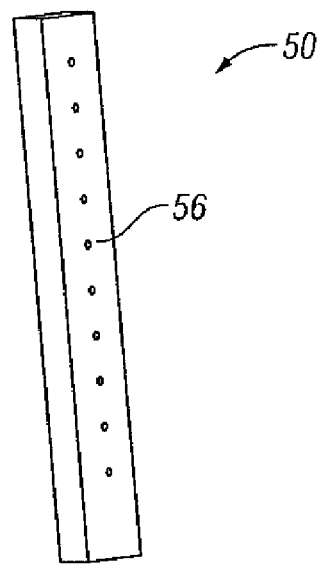
FIG. 3B is a perspective view of a support leg.

As shown in FIG. 3B, each support leg 50 is a generally rectangular, elongate member provided with a series of spaced-apart bolt holes or other apertures 56 for adjustable, selectable attachment of the support channel assembly 52 thereto. As shown in FIG. 3C, the legs 50 are clamped, bolted, or otherwise attached to the conveyor support legs 48 on one side of the conveyor system 24. Typically, the support legs 50 are dimensioned to extend between the floor and a desired maximum height of the bin transporter system 20A, so that the combined weight of the support channel assembly 52 and the roller system assembly 54 is supported by the legs 50 against the floor. The number and spacing of the support legs 50 will depend on the length of the conveyor system 24, the length of bin transporter system 20A, and/or the weight of the support channel assembly 52 and the roller system assembly 54, for preventing drooping or sagging of the support channel assembly 52 and the roller system assembly 54.

Figure 3D:
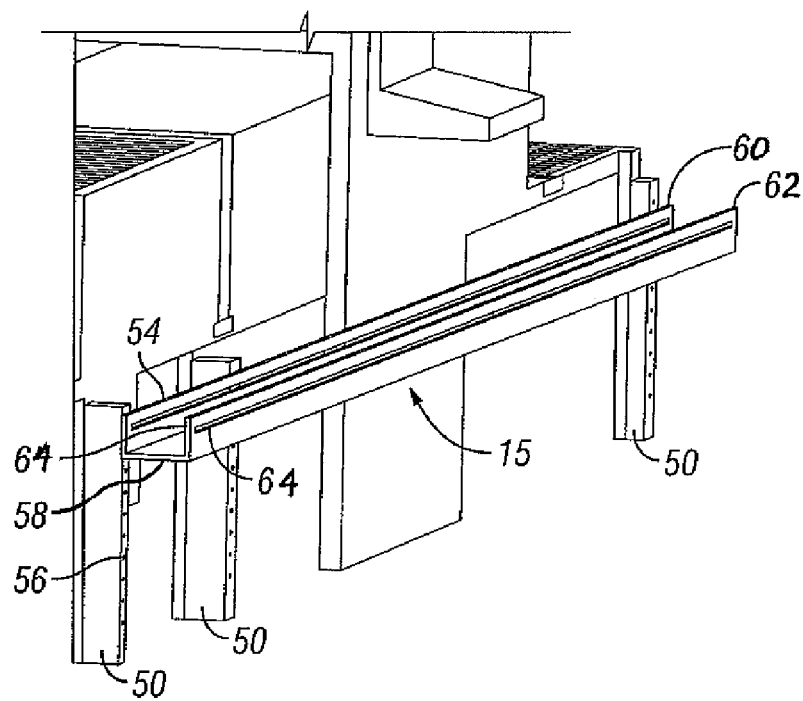
FIG. 3D is a perspective view of a channel assembly attached to the support legs.

With reference to FIG. 3D, the support channel assembly 52 is a generally elongate, trough-like member (e.g., square U-shape in cross-section) having a rectangular, flat bottom wall 58 and two vertical sidewalls 60, 62 attached to the top surface of the bottom wall 58 and extending along both long side edges of the bottom wall. The sidewalls 60, 62 are provided with one or more elongate slots or other apertures 64 for attaching the channel assembly 52 to either side of a security checkpoint conveyor system. For deployment, one of the sidewalls 60 is placed against the support legs 50, with the channel assembly 52 extending generally between the exit and entrance ends of the conveyor system. The connection slots 64 of the channel assembly 52 are aligned with respective ones of the bolt holes 56 in the adjustable legs 50, so that the conveyor exit end of the channel assembly 52 is higher than the conveyor entrance end of the channel assembly 52, e.g., the exit end of the channel assembly 52 is attached at a distance "D1" above the floor while the entrance end of the channel assembly 52 is attached at a distance "D2" above the floor, where D1>D2. Then, the channel assembly 52 is attached to the legs 50 using bolt assemblies or other connectors that extend through the connector slots 64 and bolt holes 56 in the legs 50. The height difference (D1>D2) between the two ends is selected to provide a desired degree of longitudinal inclination of the support channel assembly 52, at an angle $\beta>0°$, preferably, $25°\geq\beta\geq1°$, and more preferably $10°\geq\beta\geq1°$, as in FIG. 3E. ("Longitudinal inclination" refers to the support channel assembly being tilted, out of parallel with the floor 46, in the direction of the path of movement of the bins or trays, which typically corresponds to the longitudinal axis "L" of the channel assembly.)

The channel assembly 52 will typically be made of aluminum, a polymer, or some other lightweight, strong material, and may be manufactured using standard methods. Additionally, although a one piece, unitary channel assembly is shown in FIG. 3D, it is more typically the case that the channel assembly 52 is made of short sections of trough-like members 66 (e.g., 2-10 feet long), as shown in FIG. 3F, attached to one another, end-on-end, using side and/or bottom attachment brackets 68 or the like. Such a configuration confers a degree of modularity to the system 20A, for accommodating variously sized conveyor systems without having to custom cut or manufacture a particular length of channel assembly. In other words, instead of providing a length of unitary channel assembly that fits along a particular conveyor assembly, the installer simply connects the appropriate number of modular channel sections to one another in the field, based on the length of the particular conveyor system in question.

Figure 3G:
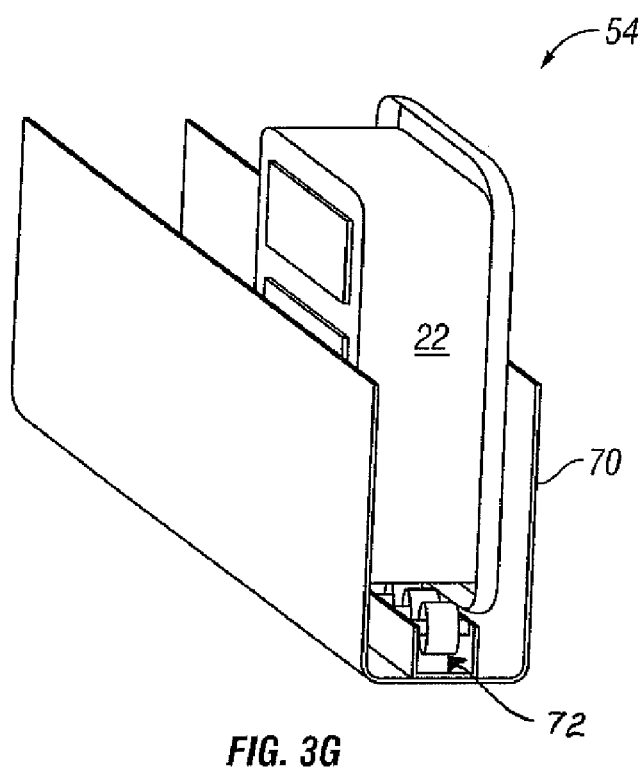
FIGS. 3G and 3H are perspective and end views, respectively, of a bin in a roller system assembly portion of the bin transporter system.
Figure 3H:
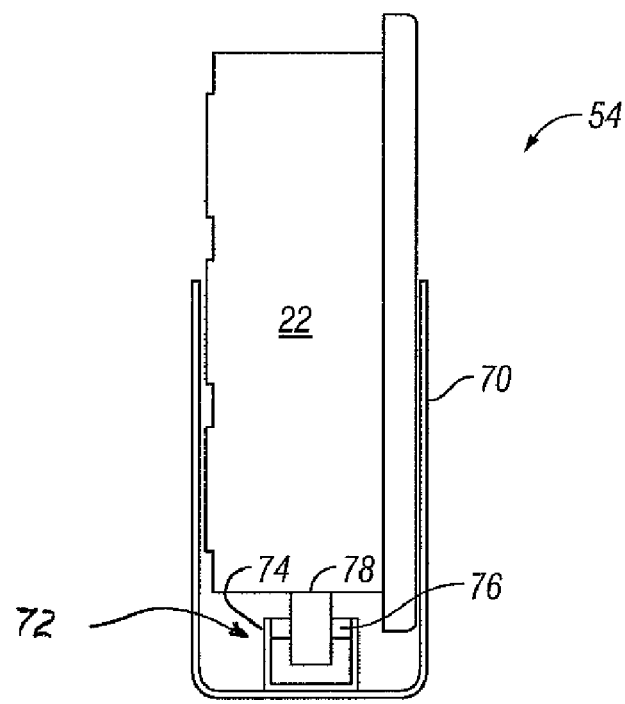

As shown in FIGS. 3A, 3G, and 3H, the roller system assembly 54 includes a roller support bin guide 70 and a plurality of roller units 72. Like the support channel assembly, the roller support bin guide 70 is a trough-like, U-shaped member, but with taller side walls for holding a bin or tray 22 on its side, in a vertical orientation. For this purpose, the distance between the side walls is slightly larger than the height of the bins 22 accommodated by the system 20A. The roller support bin guide 70 is typically made of a polymer as a unitary construction, e.g., as a plastic shell using an extrusion process, or it may be made from other materials and/or sub-components connected to one another using standard connection means. Each roller unit 72 includes left and right, parallel supports or standards 74 attached to the bottom wall of the roller support bin guide 70, an axle 76 extending between and supported by the supports 74, and a cylindrical wheel or roller 78 rotatably supported by the axle 76. The axle 76 and roller 78 may be unitary, with the ends of the axle being rotatably supported in the supports 74 by bushings, bearings, or the like. Alternatively, the roller 78 may be free to rotate about the axle 76. The roller units 72 are positioned at regular intervals along the length of the roller support bin guide 70, in a sufficient density and positioning for bins 22 to travel easily along the length of the roller system assembly 54. The roller system assembly 54 is attached to the support channel assembly 52 using standard connectors, either before or after the support channel assembly 52 is attached to the adjustable support legs 50, depending on the placement and configuration of the bolt holes, connector apertures, and the like. The roller support bin guide 70 may either be a unitary piece that extends substantially the entire length of the bin transporter system 20A, or it may be modular in nature, similar to as described above in regards to the support channel assembly 52.

As should be appreciated, one or more component portions of the roller units 72 may be integral with one another and/or integral with the roller support bin guide 70. For example, the roller unit supports 74 could each be one integral piece, integrally formed with the roller support bin guide 70, that runs the length of the roller support bin guide 70. Additionally, the roller units may be strip-like members that each include a plurality of roller wheels or the like, e.g., an integral, elongate member having roller wheels at regular intervals along its length.

For using the bin transporter system as shown in FIGS. 3A-3H, referring to FIGS. 3A and 3H in particular, a bin 22 is placed on its side in the roller support bin guide 70, with one of its side walls against the roller units 72. (As should be appreciated, this is the only orientation where the bin 22 fits in the roller support bin guide 70.) The side walls of the roller support bin guide 70 maintain the bin 22 in the upright position. Additionally, because the roller units 72 are offset from the bottom of the roller support bin guide 70, the lip or rim of the bin 22 is accommodated in the clearance space between the roller units and roller support bin guide, as shown in FIG. 3H, enabling the side of the bin 22 to lie flat against the rollers 78. Because the support channel assembly 52 and roller system assembly 54 are longitudinally inclined, as shown in FIGS. 3D and 3E, the bin 22 moves along the roller units 72 down the length of the roller support bin guide 70, under action of gravity. Maintaining the bins 22 in a vertical orientation, on their sides, reduces the side profile or depth of the bin transporter system. For example, as implemented in FIG. 3A, for standard size bins 22, the system has a depth of only 6 inches, which minimizes its intrusiveness into the security screening operation.

The bin transporter system 20A as shown in FIGS. 3A-3H will typically be placed on the operator side of the security imaging device 38, for security purposes. Additionally, one or more channel/roller unit extensions may be provided at the entrance and/or exit ends of the conveyor system 24, using freestanding units or otherwise (see the description of FIGS. 6A-6L below), for directing bins to a particular spot or area around the conveyor system. Such extensions may include bent or curved portions.

Figure 4:
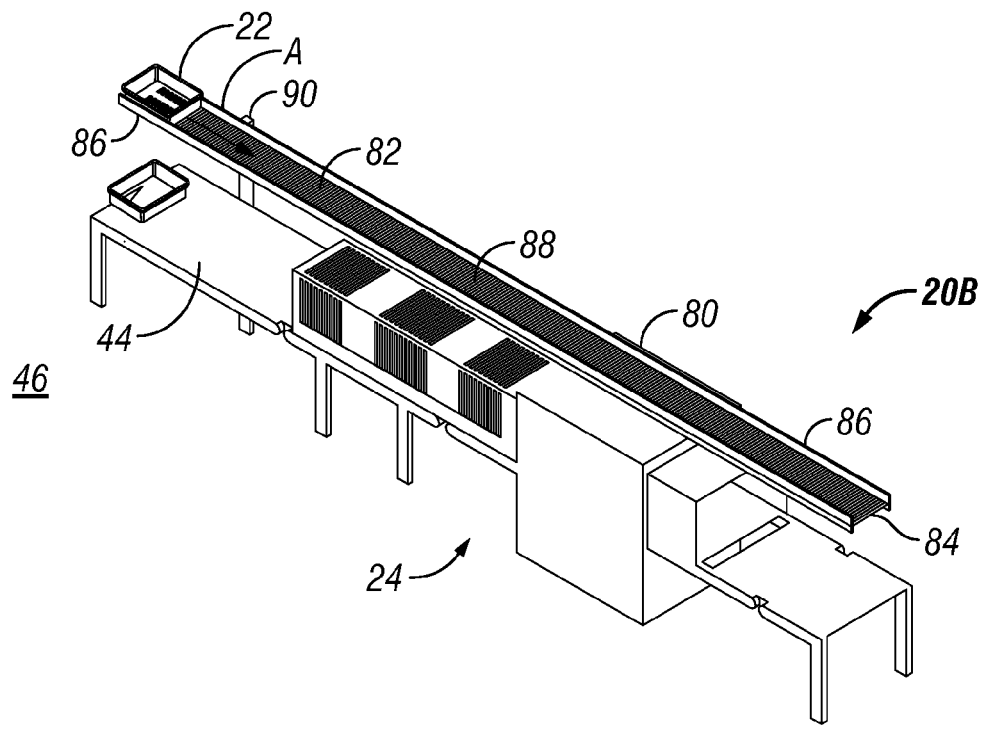
FIG. 4 is a perspective view of a second embodiment of the bin transporter system.

FIG. 4 shows a second embodiment of the bin transporter system 20B, which accommodates bins 22 in a horizontal orientation, that is, the top opening of the bin is generally parallel to the floor surface. Here, two roller conveyor sections 80, 82 are clamped or otherwise attached to the top of the security checkpoint conveyor system 24. Each roller conveyor section 80, 82 includes a support bed 84, left and right side rails 86 attached to either side of the support bed, and a plurality of parallel, sequentially arrayed rollers 88 sandwiched between the side rails 86 above the bed 84. The side rails 86 are spaced apart sufficiently to accommodate and guide the bins in a horizontal orientation, that is, the bottoms of the bins are placed against the rollers 88 for movement down the roller conveyor sections. For outfitting a conveyor system 24 with the bin transporter system 20B, the first section 80 is directly clamped to the top of the conveyor system, and extends from proximate to the exit end of the conveyor to the entrance end of the conveyor. The second section 82 extends further over the egress ramp or shoot portion 44 of the conveyor system. The second section 82 is connected to the first section 80 to form a generally continuous length of rollers, with the two sections 80, 82 being longitudinally inclined for gravity-actuated movement of the bins 22 from one end of the two sections 80, 82 to the other, in the direction indicated by arrow "A." The second conveyor section 82 may be outfitted with legs or other supports 90 that extend down to the egress shoot 44 or to the floor 46, for supporting the second conveyor section 82 above the egress shoot 44. Also, additional sections of roller conveyors may be attached to the sections 80, 82, for extending the bin transporter system 20B to a desired location. Non-roller tables or platforms (not shown) may also be provided for stacking returned bins 22 for temporary storage.

Figure 5A:
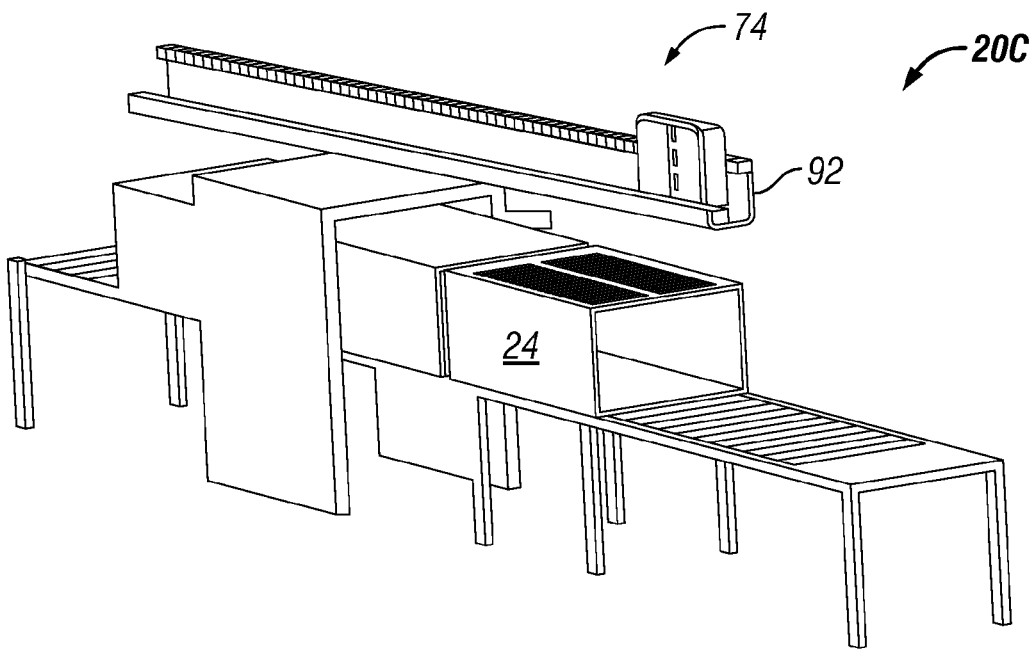
FIG. 5A is a perspective view of a third embodiment of the bin transporter system.
Figure 5B:
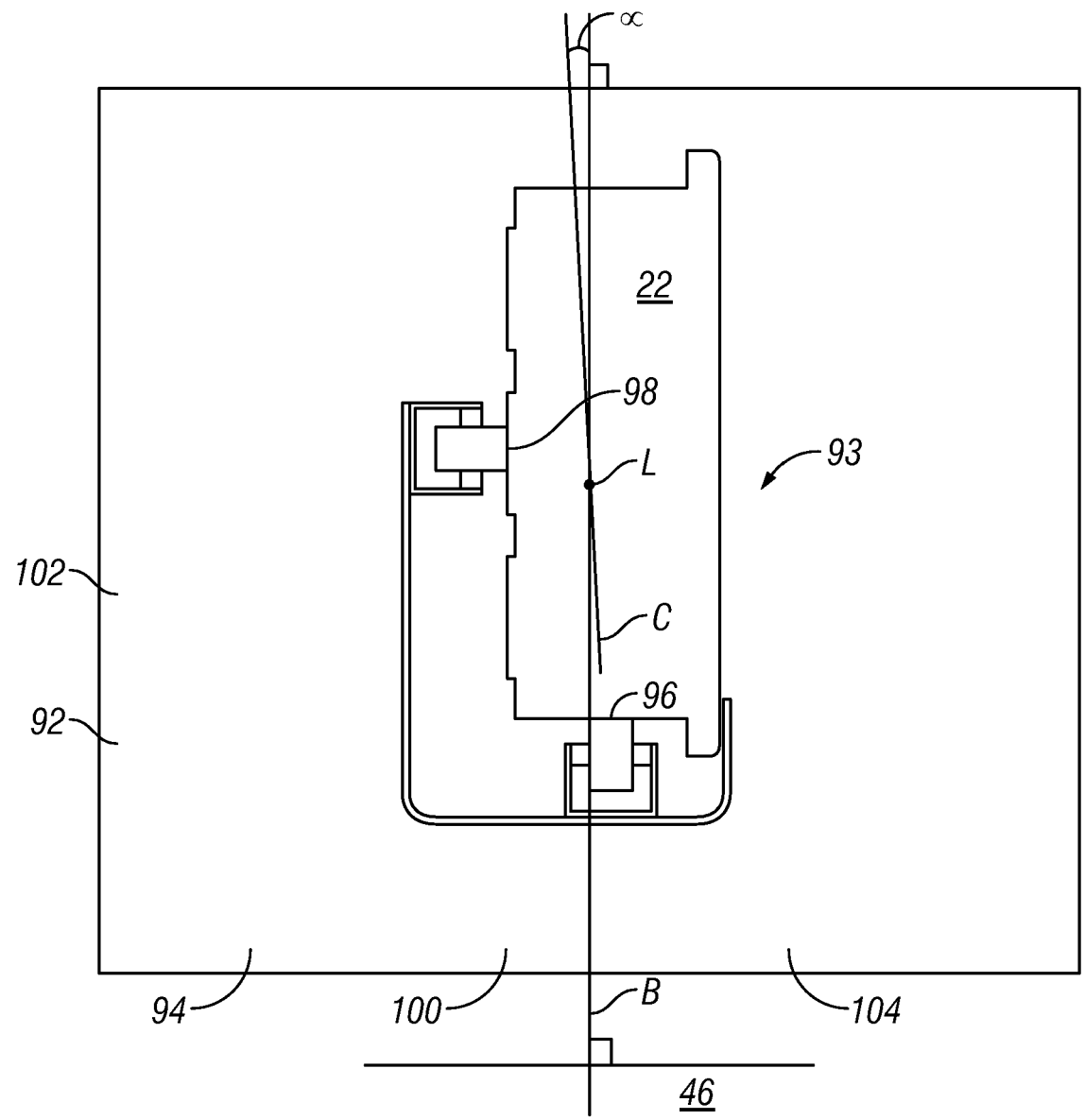
FIG. 5B is an end view of a bin in a roller system assembly portion of the bin transporter system of FIG. 5A.

FIGS. 5A and 5B show a third embodiment of the bin transporter system 20C. Like the system 20B shown in FIG. 4, the bin transporter system 20C is attached to the top of a security checkpoint conveyor system 24. Here, however, bins or trays 22 are maintained in a generally vertical, but slightly reclined position, with the roller support bin guide portion 92 of the system 20C having an open "front" face 93 for easy access to the bins 22.

To explain further, although bin transporters that maintain bins in a vertical orientation (such as those shown in FIGS. 3A-3H) are compact and functional, they require the use of high side walls for maintaining the bins 22 in place on their sides. This requires that the bins 22 be loaded into and out of the bin transporter system, over the high side walls, which increases the amount of time involved in using the bin transporter. In the bin transporter system 20C shown in FIGS. 5A and 5B, however, one of the side walls of the roller support bin guide 92 is abbreviated, e.g., lip-like, enabling bins 22 to be loaded and unloaded from the roller support bin guide 92 much faster.

In this embodiment, the bin transporter system 20C includes one or more sections of roller system assembly 94. If multiple sections are provided, for modular installation, each section will typically be from 2-10 feet long, with an appropriate number of sections being connected together according to the length of the security checkpoint conveyor system 24. If a single, unitary section is utilized, it is cut or otherwise manufactured to a desired length, again, based on the length of the security checkpoint conveyor system 24, or otherwise on the length over which bins are to be transported. In either case, each section of roller system assembly 94 includes a roller support bin guide 92, one or more bottom roller units 96, and one or more side roller units 98. The roller support bin guide 92 is a generally elongate member, generally L-shaped in cross-section (see FIG. 5B), having a flat bottom wall 100, a rear wall 102 connected along one long edge of the bottom wall 100, and a lip-like front wall 104 connected along the other long edge of the bottom wall 100. The bottom roller units 96 are attached to and along the bottom wall 100, and include elements similar to those described above in regards to the roller units in FIG. 3H. The side roller units 98 are attached to the rear wall 102, at or near the top of the wall 102, and oriented generally perpendicular to the bottom roller units 96 for contacting the bottom of a bin 22 when it is placed on its side in the roller support bin guide 92. The front wall 104 of the roller support bin guide 92 is substantially shorter than the rear wall 102, so that while the vertically oriented top of the bin 22 lies generally exposed, the bottom edge or lip of the bin 22 lies below the top of the front wall 104 when the bin is placed against the bottom roller units 96.

Because the front wall 104 is much shorter than the rear wall 102, the bin transporter system 20C is configured to hold the bins 22 laterally tilted at a slight angle, for maintaining the bins 22 in place in the roller support bin guide 92 and against the roller units 96, 98, thereby preventing the bins 22 from falling out of the roller support bin guide 92 over the front wall 104. "Laterally tilted" generally refers to the bins being angled back off vertical, and more specifically refers to the bins being angled back by an angle "α" as shown in FIG. 5B, where: $\alpha > 0°$, and preferably $2° \leq \alpha \leq 20°$, and more preferably $10° \leq \alpha \leq 20°$; axis "B" is an axis perpendicular to the ground or support surface 46; axis "C" is an axis or plane parallel to the bottom wall and rim of a typical bin 22, in which the bottom wall and rim are parallel; and angle α is the angle between axis B and axis C. (The axis "L" in FIG. 5B, the direction of movement of bin, is shown as being perpendicular to axis B and axis C, but this would not be the case when the roller system assembly 94 is longitudinally inclined for gravity-actuated movement of the bins, as in FIG. 3E.) As should be appreciated, whereas the bins 22 would otherwise scrape against the rear wall when laterally tilted, the side roller units 98 prevent this from happening, facilitating passage of the bins down the roller system assembly 94.

Lateral tilting of the bins 22 can be established in any one of several different manners. In one, the roller units 96, 98 are titled out of parallel with the bottom and rear walls of the roller support bin guide, respectively. In another, the roller units 96, 98 are parallel with the roller support bin guide 92, but the entire roller system assembly 94 is laterally tilted. Other arrangements are possible.

As shown in FIG. 5A, the bin transporter system 20C is attached to the top of a security checkpoint conveyor system 24, in a longitudinally inclined orientation for gravity-actuated movement of the bins 22. For doing so, the roller system assembly 94 may be attached directly to the conveyor system 24, or an attachment bracket, set of brackets, or support channel assembly may be used to connect the roller system assembly to the conveyor system.

FIGS. 6A-6K show another embodiment of the bin transporter system 20D. This embodiment is generally similar to the bin transporter system 20C shown in FIGS. 5A and 5B, but includes a free-standing roller system assembly 106 that is unconnected to the security checkpoint conveyor system 24. Thus, the bin transporter system 20D includes one or more sections of roller system assembly 106, and a plurality of free-standing, adjustable support stands 108 that hold and support the roller system assembly 106. The support stands 108 can be adjusted to hold the roller system assembly 106 in a longitudinally inclined manner. Additionally, the roller system assembly 106 is laterally tilted, akin to as described above in regards to FIG. 5B.

Figure 6A:
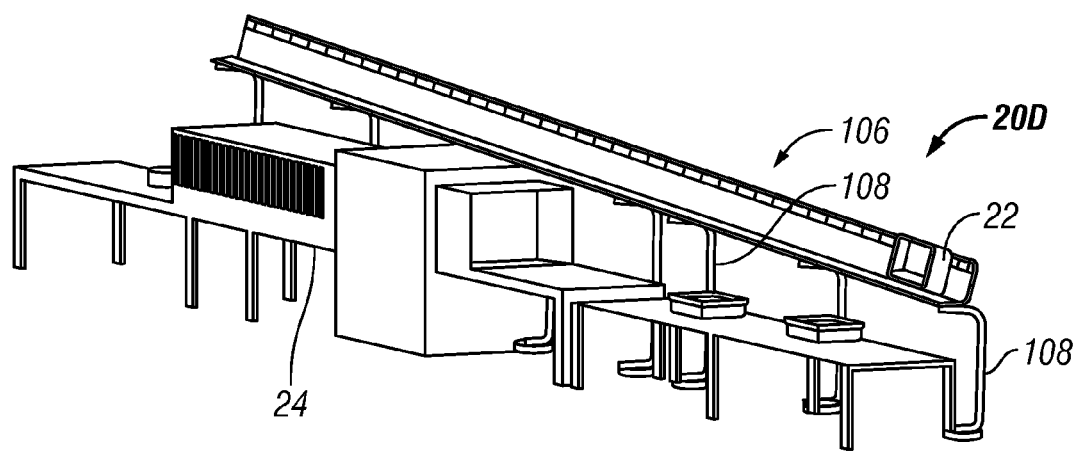
FIGS. 6A, 6F, and 6G are perspective views of a fourth embodiment of the bin transporter system.
Figure 6B:
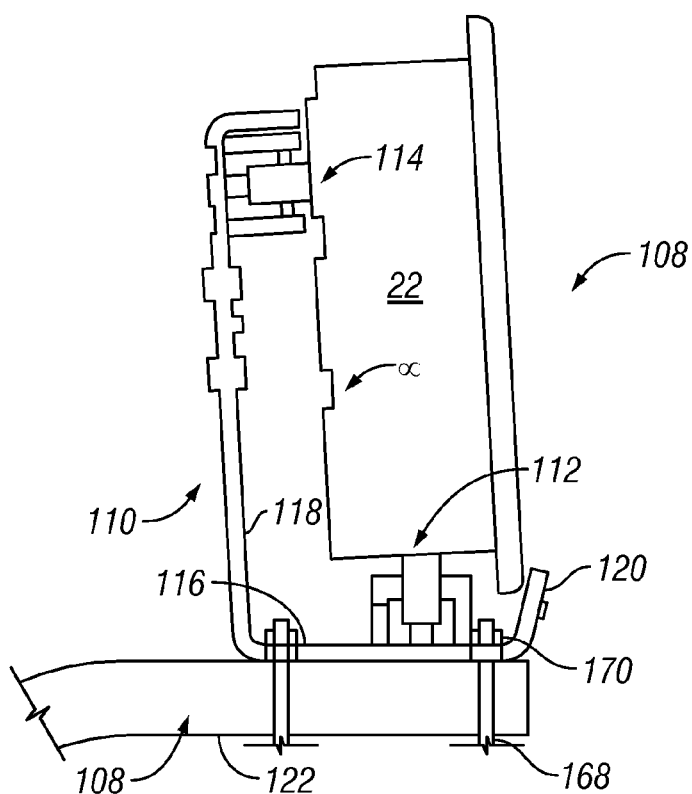
FIG. 6B is an end view of a bin in a roller system assembly portion of the bin transporter system of FIG. 6A.

FIG. 6B shows the roller system assembly 106 in more detail. As indicated, the assembly 106 includes a roller support bin guide 110, bottom roller units 112, and side roller units 114. The roller support bin guide 110 is generally L-shaped in cross section, and includes a bottom wall 116, a rear wall 118, and a lip-like front wall 120 that is substantially shorter than the rear wall 118, that is, the front wall is no more than ⅓ the height of the rear wall. (The various wall portions may be integrally formed, from a polymer or otherwise, or they may be individual components connected together using standard connection means.) The bottom roller units 112 are attached to the bottom wall 116, and the side roller units 114 are attached to the rear wall 118, for contacting the side and bottom of a bin 22, respectively. Instead of being perpendicular to the bottom wall 116, the rear wall 118 is angled back slightly, by an angle $\alpha > 0°$, and preferably $2° \leq \alpha \leq 20°$, and more preferably $10° \leq \alpha \leq 20°$, for laterally tilting the bins 22. The bins may be laterally tilted using other means, as described above, and/or by having an upper support arm portion 122 of the stands 108 angled slightly upwards.

Figure 6E:
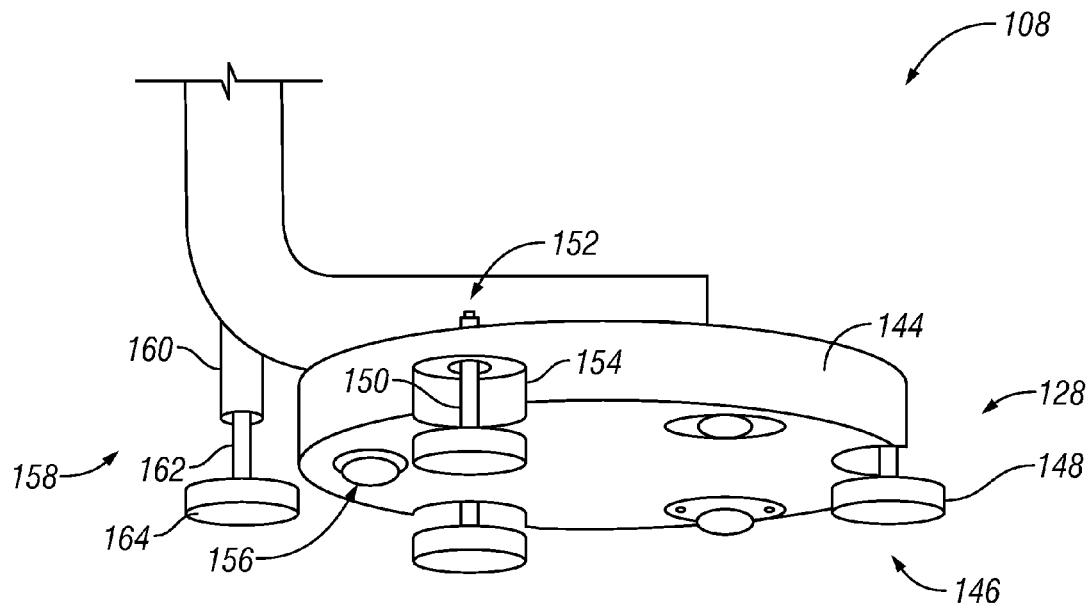
FIGS. 6C-6E are perspective views of various portions of a support stand portion of the bin transporter system of FIGS. 6A and 6B.
Figure 6C:
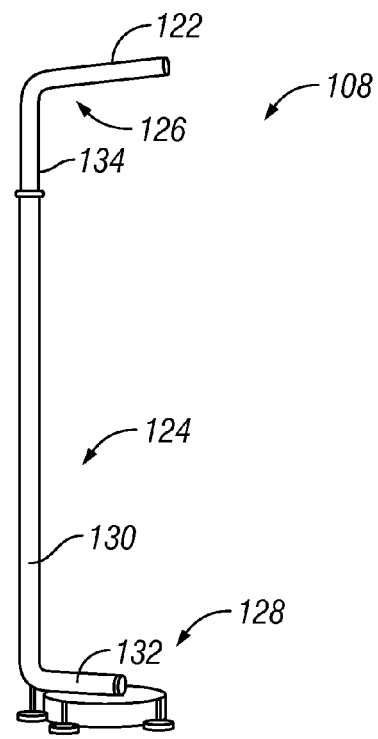
Figure 6D:
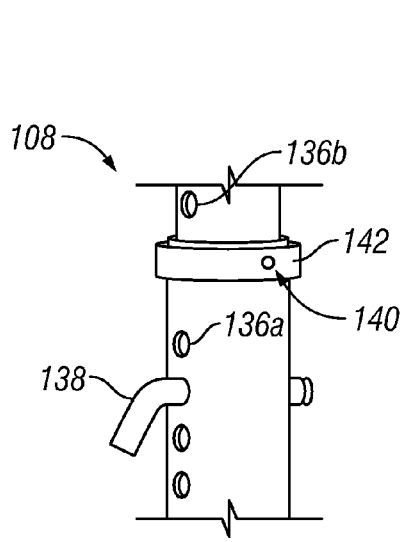

FIGS. 6C-6E show one embodiment the stands 108 in more detail. The stand 108 includes a lower leg 124, an upper leg 126, and a base 128. Together, the lower leg 124 and the upper leg 126 form a generally C-shaped stand member, whose height is adjustable. The lower leg 124 is tubular, with a generally hollow longitudinal interior, and includes an upright primary portion 130 and a foot 132 attached to a lower end of the upright primary portion 130. The foot 132 is generally perpendicular to the upright portion 130. The upper leg 126 is also tubular, and includes a straight primary member 134 and an upper support arm portion 122 attached to an upper end of the primary member 134. The upper support arm portion 122 may lie perpendicular to the straight primary member 134, or it may be angled slightly off perpendicular (e.g., preferably 4° to 20° off perpendicular) for purposes of laterally tilting the bins 22. The upper leg 126 is slightly smaller in diameter than the lower leg 124, so that the upper leg 126 fits inside the lower leg 124, for a close, sliding fit.

For adjusting the overall height of the stand 108, the lower and upper legs 124, 126 are provided with lateral apertures 136*a*, 136*b* that extend through the legs. Once one of the lateral apertures 136*b* of the upper leg 126 is aligned with a selected one of the lateral apertures 136*a* of the lower leg 124, a locking pin 138 is inserted through the lateral aperture 136*a* of the lower leg, through the lateral aperture of the upper leg located within the lower leg, and out the other side. The upper leg 126 rests on the locking pin 138, preventing the upper leg from sliding further into the lower leg 124. The height of the stand may be adjusted (typically within a range of 2 feet to 7 feet) by moving the upper leg up or down in the lower leg, as desired, and then inserting the pin through an aligning pair of lateral apertures.

The stand 108 may include other locking means, such as a set screw or other mechanical lock 140, for further holding the upper leg 126 in place with respect to the lower leg 124. For example, as shown in FIG. 6D, a set screw 140 extends through a collar 142 positioned at the upper end of the lower leg 124. When the set screw 140 is screwed inwards, it engages the upper leg inside the longitudinal interior space of the lower leg.

The base 128 includes a squat, generally cylindrical body 144, which is attached to the underside of the foot portion 132 of the lower leg 124, so that the lower leg 124 extends generally vertically upwards when the bottom of the body 144 is placed against the floor 46, as shown in FIG. 6C. The body 144 is typically made from a heavy material such as metal, or is otherwise weighted for stabilizing the stand 108. The base 128 also includes one or more leveling feet 146. For example, four such leveling feet 146 are shown in FIG. 6E. Each leveling foot 146 includes a support disc or foot 148, a threaded member 150 attached to the top of the support disc and extending up through the body 144, and a threaded engagement assembly 152 (e.g., nut and washer) attached to the top end of the threaded member 150. The support discs 148 are adjustably moveable between two end positions. In the first end position, the disc 148 lies extended out past the bottom surface of the base body 144. In the second end position, the disc 148 lies tucked up into a rounded clearance 154 provided in the side of the base body 144, above the bottom surface of the base body 144. The disc 148 is moved between these end positions by, e.g., loosening the threaded engagement assembly 152, moving the disc and threaded member 150 to a desired position, and retightening the threaded engagement assembly 152 against the top surface of the base body 144. Besides the rounded clearance spaces 154, the base body 144 is provided with vertical apertures for accommodating the threaded members 150. The vertical apertures may themselves be provided with complementary threads for engaging the threaded members 150.

The leveling feet 146 perform two primary functions. The first is to provide several points of height adjustment for the base body 144, to accommodate irregularities in the floor or other support surface 46. For example, if there is a ridge or bump in the floor at the location where the support stand 108 is to be placed, one of the support discs 148 can be adjusted for lying closer to the base body 144 than the other support discs, for maintaining the base body 144 in generally parallel orientation to the floor 46. The second function is to facilitate the use of ball rollers, wheels, casters, or other rolling elements 156 in the bottom of the base body 144. In particular, the base 128 may be provided with rolling elements 156 attached to the underside of the base body 144. For example, in the case of a ball-type roller, a roller ball would be housed inside a bearing aperture in the base body, and kept in place using a removable collar. The rolling elements 156 allow the support stand 108 to be rolled from one location to another, without having to lift the support stand off the floor. For using the rolling elements 156, the leveling feet 146 are first adjusted for moving the support discs into the rounded clearances 154 in the base body, raising them above the level of the rolling elements 156. Then the support stand is rolled to a desired location, and the leveling feet are readjusted for lowering the support discs below the bottommost point of the rolling elements, for holding the support stand in place.

One or more of the leveling feet 146 may be attached elsewhere than to the base body 144. For example, as shown in FIG. 6E, a leveling foot 158 is attached to the lower stand leg 124, in the vicinity of the rear junction between the primary portion 130 and the foot 132. Here, the leveling foot 158 includes a standard 160 attached to the lower stand leg 124, a threaded member 162 that fits in a longitudinal aperture in the standard 160 (which is provided with complementary threads), and a support disc or foot 164 attached to one end of the threaded member. For adjusting the height of the support disc 164, the threaded member 162 is simply screwed into or out of the threaded aperture in the standard 160.

As should be appreciated, instead of a generally round stand base 128, the stand base may be oblong, square, or shaped otherwise. Additionally, the stand base may include more than three leveling feet. For example, in one embodiment, the support stand is oblong, and includes four leveling feet, which are positioned at regular intervals along the oblong base, i.e., one at each of the four "corners" of the base.

Figure 6F:
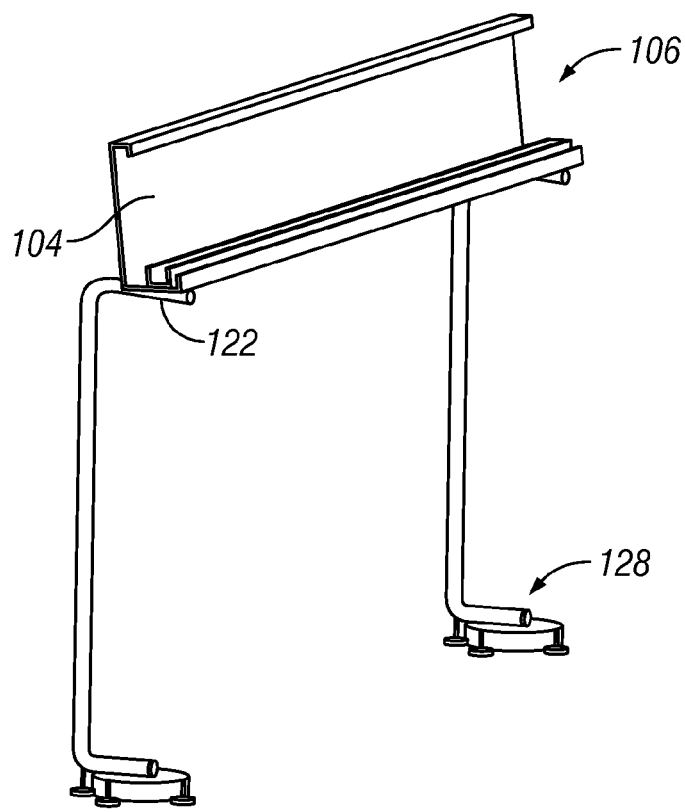
Figure 6G:
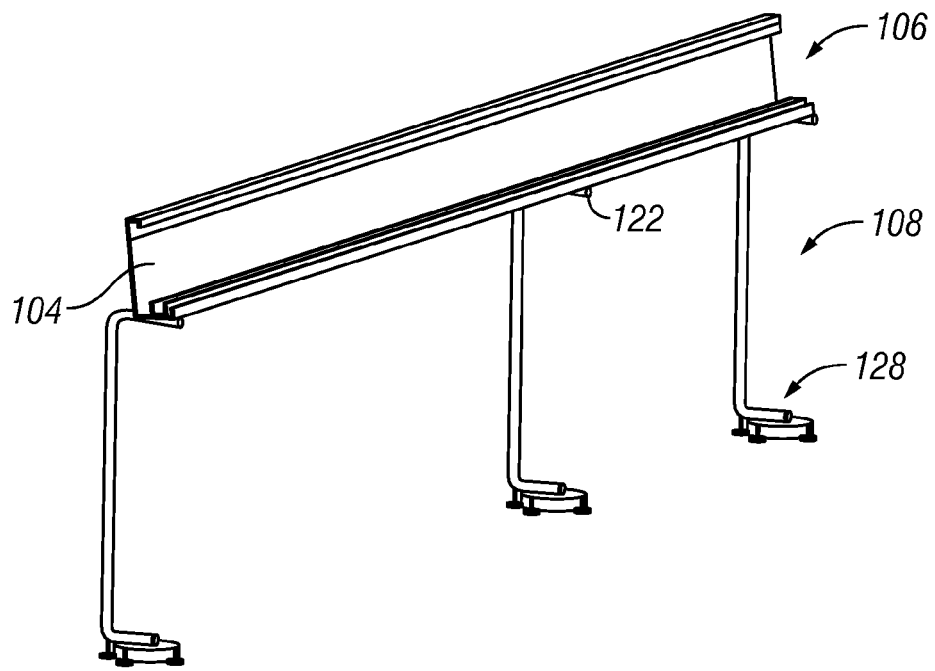

For using the stands 108, one or more sections of roller system assembly 106 (i.e., either one section, or two or more sections securely connected together) are attached to the top sides of the support arm portions 122 of two or more stands 108, as shown in FIGS. 6F and 6G. If the support arms 122 are inclined or tilted, then the roller system assembly 106 is attached so that the open front face of the roller system assembly is tilted upwards, for maintaining bins 22 in place against the roller units. If the support arms 122 are not inclined, then the roller system assembly 106 can be attached as shown in FIGS. 6F and 6G, or in the opposite orientation. For attaching the roller system assembly 106 to the support arms 122, U-bolt or other clamp-like assemblies 166 can be used, as shown in FIG. 6B. Each U-bolt assembly 166 includes a U-bolt or similar component 168 that extends around the support arm 122, and that is secured to the bottom wall 116 of the roller support bin guide 110 by a bracket member and nut assembly 170 or the like. Other connection mechanisms are possible.

Figure 6J:
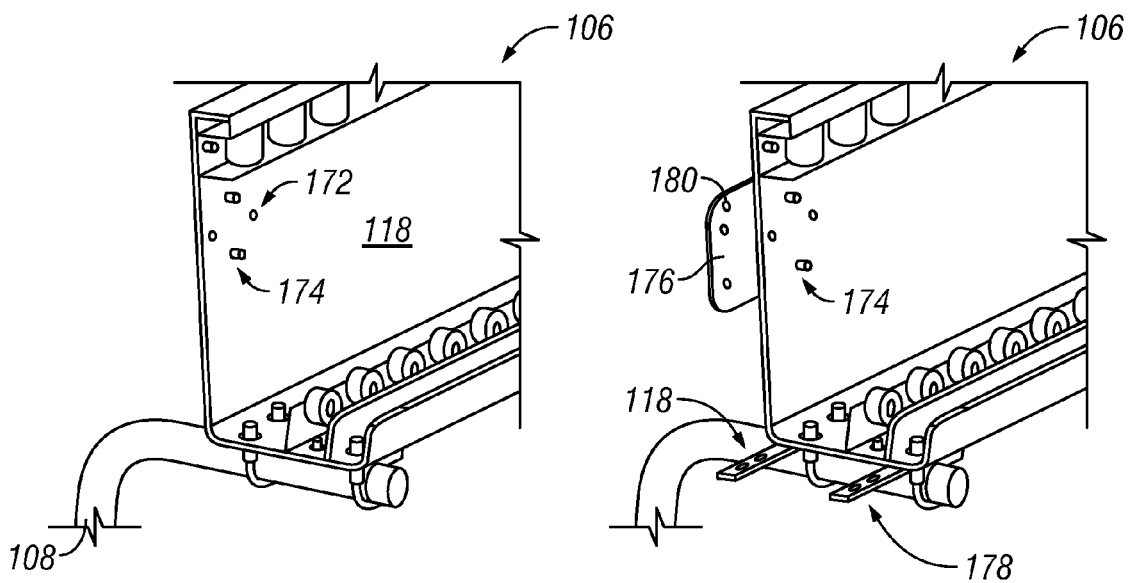
Figure 6J:
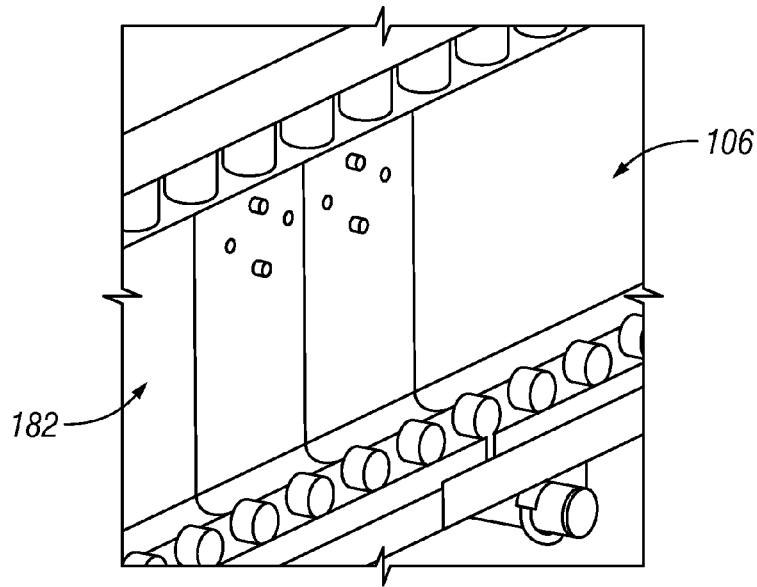

FIGS. 6H-6J show one manner in which longitudinally adjacent sections of roller system assembly 106 are connected to one another. FIG. 6H shows one end of a section of roller system assembly 106 by itself. The rear wall 118 of the roller support bin guide 110 includes one or more connection apertures 172 and/or connection tabs or protrusions 174. (The tabs 174 extend out past the back side surface of the rear wall 118.) FIG. 6I shows the roller system assembly 106 outfitted with a rear connection bracket or tie 176 and two bottom connection brackets or ties 178. The rear connection bracket 176 includes two sets of attachment holes 180 that correspond (in terms of spacing and position) with the tabs 174. (Only one set of holes 180 is shown in FIG. 6I, but the second lies aligned behind the tabs 174.) For connecting the rear connection bracket 176 to the back side of the rear wall 118, one set of the attachment holes 180 is disposed over the portion of the tabs 174 that extends out from the back of the rear wall 118. The bracket 176 is secured in place using rivets, nuts, or the like. The bottom connection brackets 178 are sandwiched between the bottom wall 116 of the bin guide 110 and the support stand arm portions 122, for extending out from the end of the bin guide 110 in a longitudinal direction. The brackets 178 may be connected to the bin guide using standard connection means such as nuts and bolts. For attaching an additional section of roller system assembly 182 adjacent to the first section 106, as shown in FIG. 6J, the additional section 182 is aligned with and placed against the rear connection bracket 176 and bottom connection brackets 178, and secured in place.

Figure 6K:
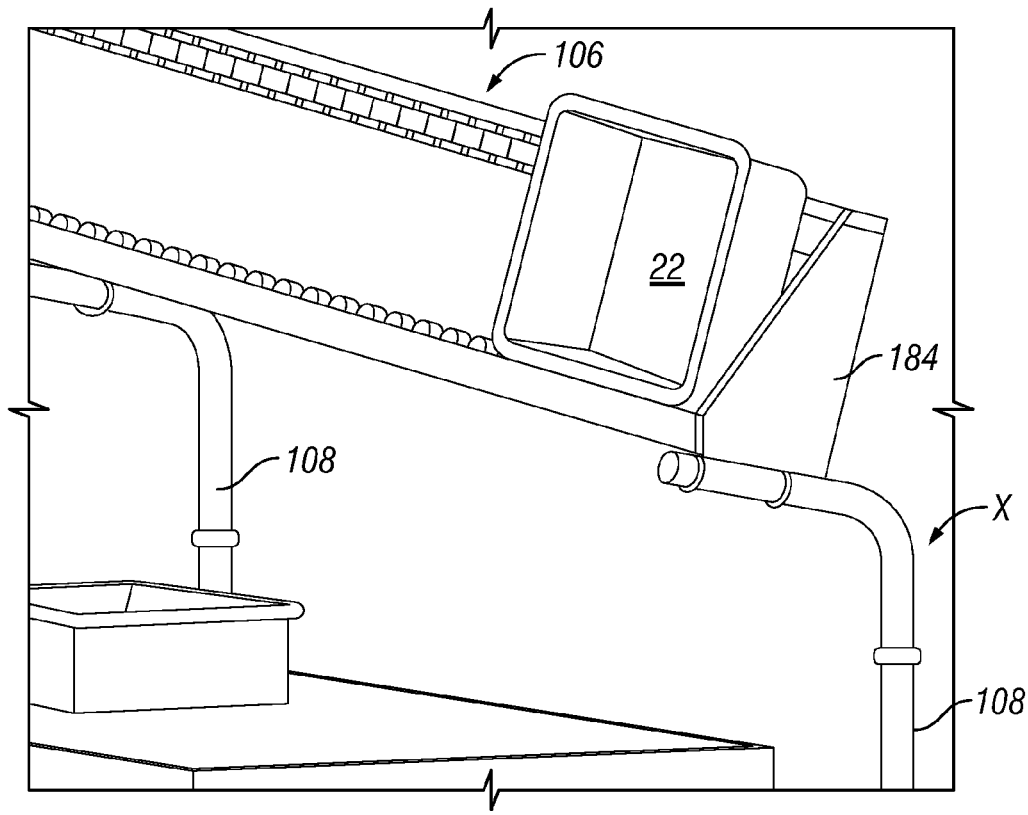
FIG. 6K is a perspective view of an end cap portion of the bin transporter system.

As shown in FIG. 6K, the end of a section of roller system assembly 106 may be outfitted with an end cap 184. The end cap is attached to the end of the roller system assembly, e.g., to the roller support bin guide 110, and lies generally perpendicular to the longitudinal axis of the roller system assembly. This prevents bins 22 from falling out of the roller support bin guide once they reach the end of the roller system assembly 106, at the end point of the bins' designated path of travel. Also, as should be appreciated, the stands 108 are particularly well suited for sign mounting, for example, on the end cap 184 or in the area of the stand generally indicated by "X" in FIG. 6K.

Figure 6L:
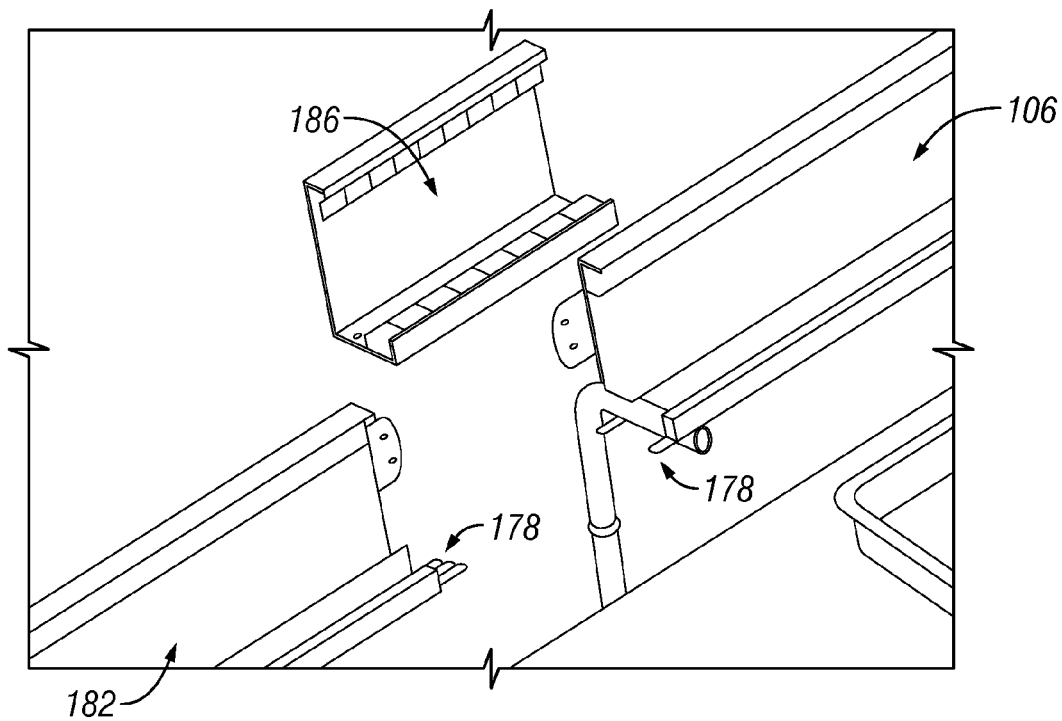
FIG. 6L is a perspective view of a non free-standing connection or extension section of roller system assembly.

With reference to FIG. 6L, in addition to sections of roller system assembly 106, 182 supported by stands 108, extension or connection sections 186 may be positioned between two sections of free-standing roller system assembly, for adjusting the overall operable length of the bin transporter system. Such a section 186 could rest on the bottom connection brackets 178 of two opposing, adjacent sections of roller system assembly 106, 182. Besides being used for length adjustment, such a configuration is also advantageous in situations where a door, wall, or other barrier is put in place between the secure area portion of the security checkpoint and a non-secure area of the checkpoint, when the checkpoint is closed for the night or otherwise out of service. For use in such a situation, one section of free-standing roller system assembly 106 is placed in the non-secure area, and another section of roller system assembly 182 is placed in the secure area. The extension or connection section 186 is located between the two, in the designated path of the door, wall, screen, or other moveable barrier. When it is desired to move the barrier into place for closing the security checkpoint, the extension or connection section 186 is simply removed from between the two other sections 106, 182, and placed to the side. This establishes a gap between the two sections 106, 182, allowing the barrier to be moved into place between the two sections 106, 182.

Figure 7A:
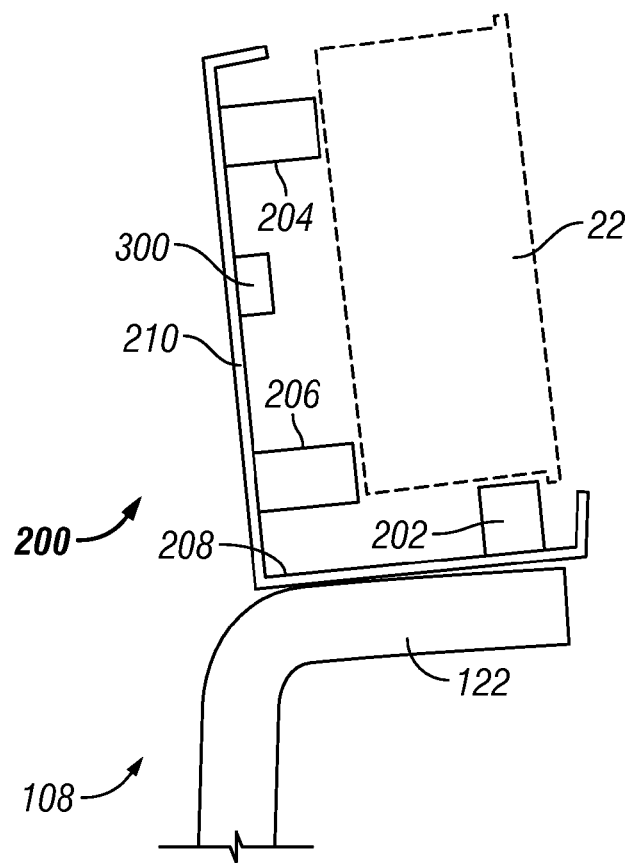
FIGS. 7A and 7B are schematic end views of a fifth embodiment of the bin transporter system.
Figure 7B:
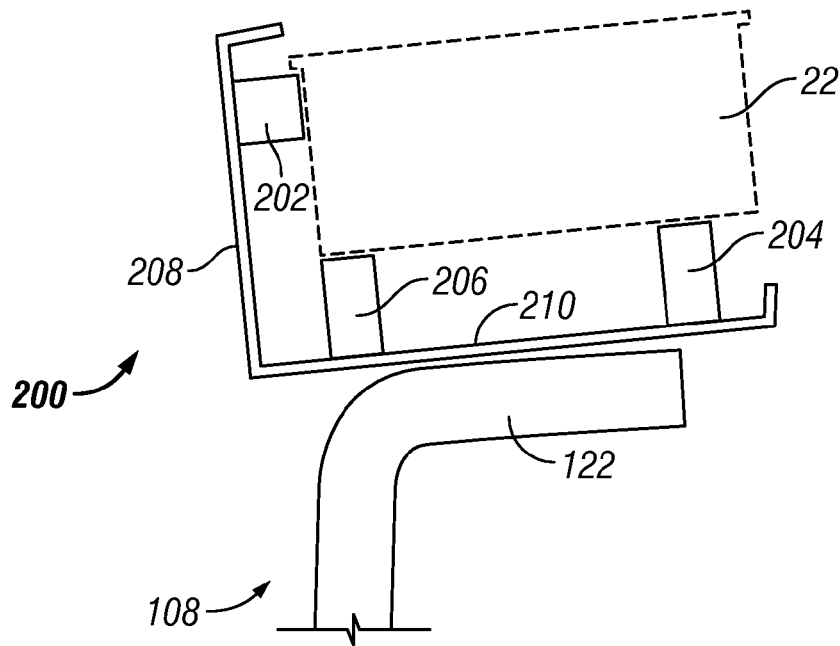

Referring to FIGS. 7A and 7B, in another embodiment of the bin transporter system 20E, sections of roller system assembly 200 are configured for "reversible" operation, that is, the roller system assembly 200 can be positioned both for the transport of bins 22 in a vertical orientation (FIG. 7A), and for the transport of bins 22 in a horizontal orientation (FIG. 7B), where in both positions the bins are laterally tilted when placed in the roller system assembly 200. In the example shown, the roller system assembly 200 is generally similar to the roller system assembly 106 shown in FIG. 6B. However, instead of having only "bottom" and "side" roller units 202, 204, respectively, the assembly 200 additionally includes a third set of roller units 206. The third set of roller units 206 serves to supplementally support the bins 22 for transport in both the vertical and horizontal orientations. For deploying the roller system assembly 200 for transporting bins in a vertical laterally tilted orientation, a short wall portion 208 of the assembly 106 is attached to the stand support arm portion 122. For deploying the roller system assembly 200 for transporting bins in a horizontally laterally titled orientation, a long wall portion 210 of the assembly 200 is attached to the support art 122. Between the two positions, from the orientation of FIG. 7A, the assembly 200 is simply flipped vertically and rotated 90°.

For specific use at a security checkpoint, e.g., an airport security checkpoint, one embodiment of the bin transporter system has the following features or characteristics: (i) reversible, as in FIGS. 7A and 7B above, for horizontal or vertical mounting; (ii) accommodates the loading of bins either by passengers or security personnel; (iii) a height adjustability of 2'8" to 6'2" from the floor; (iv) does not exceed 10" in width, excluding base or support assemblies; (v) freestanding and independent of the conveyor system; (vi) gravity feed operation; (vii) installation or use does not require modification of the conveyor system or imaging device; (viii) accommodates and/or does not interfere with existing security gates that are closed upon checkpoint shutdown; (ix) provides a mounting assembly for the imaging device monitor, etc.; (x) capable of holding at least 23 bins at any given time; (xi) configured for holding bins in place while rolling to the conveyor entry area, while allowing for easy passenger pickup, e.g., the bins are laterally tilted as described above; and (xiii) assembly instructions and/or specialized assembly tools are provided with the unit for disassembly and/or movement of the system by security personnel. Additionally, in one embodiment, the "high" end of the bin transporter system, i.e., the end at which bins are loaded into the system, is no more than 5'9" above the floor, which reasonably accommodates use by persons of varying heights.

Figure 8A:
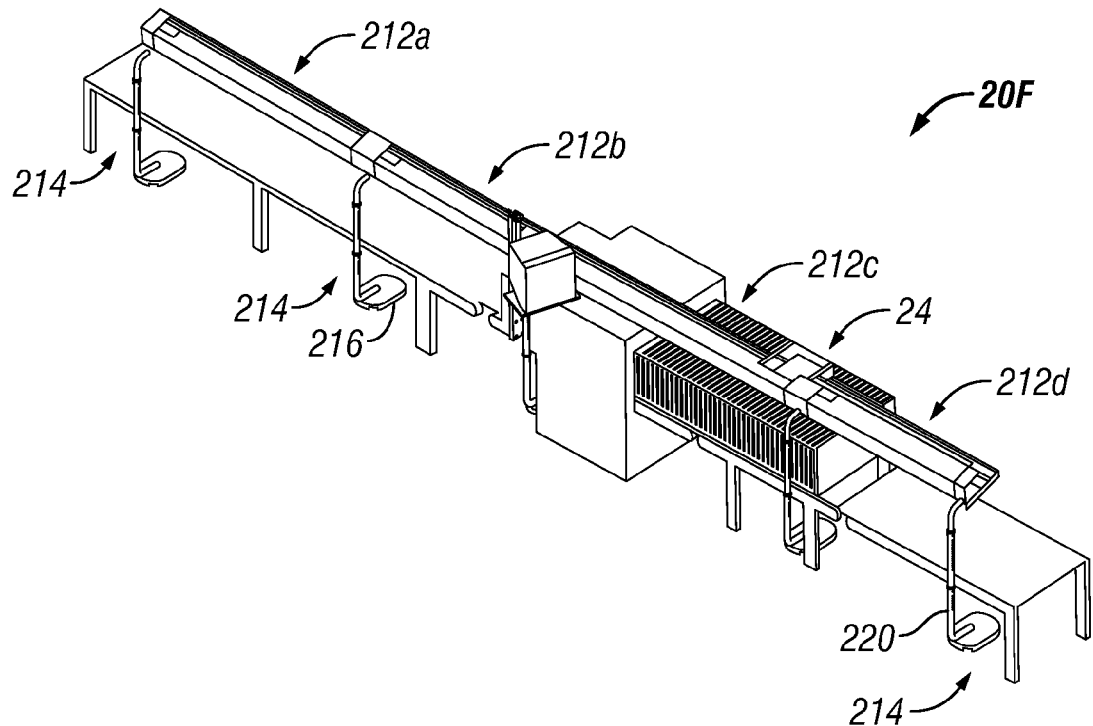
FIGS. 8A-8Q are various views of an additional embodiment and implementation of the bin transporter system.
Figure 8B:
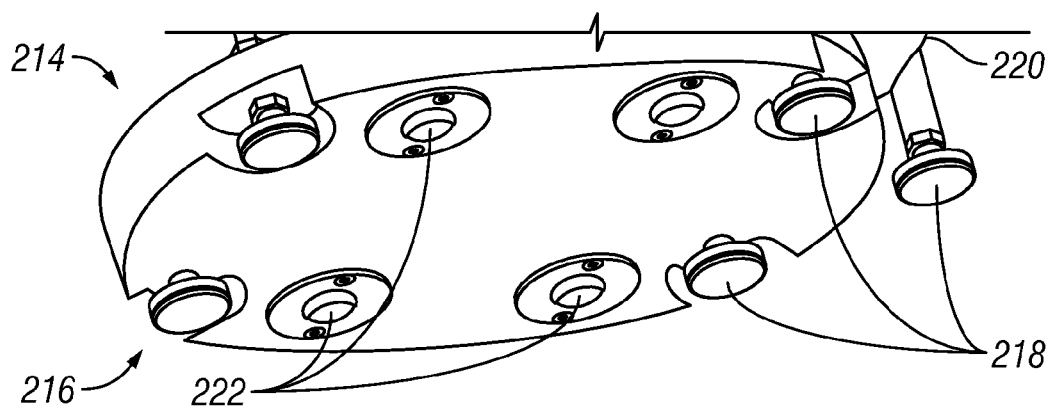
Figure 8C:
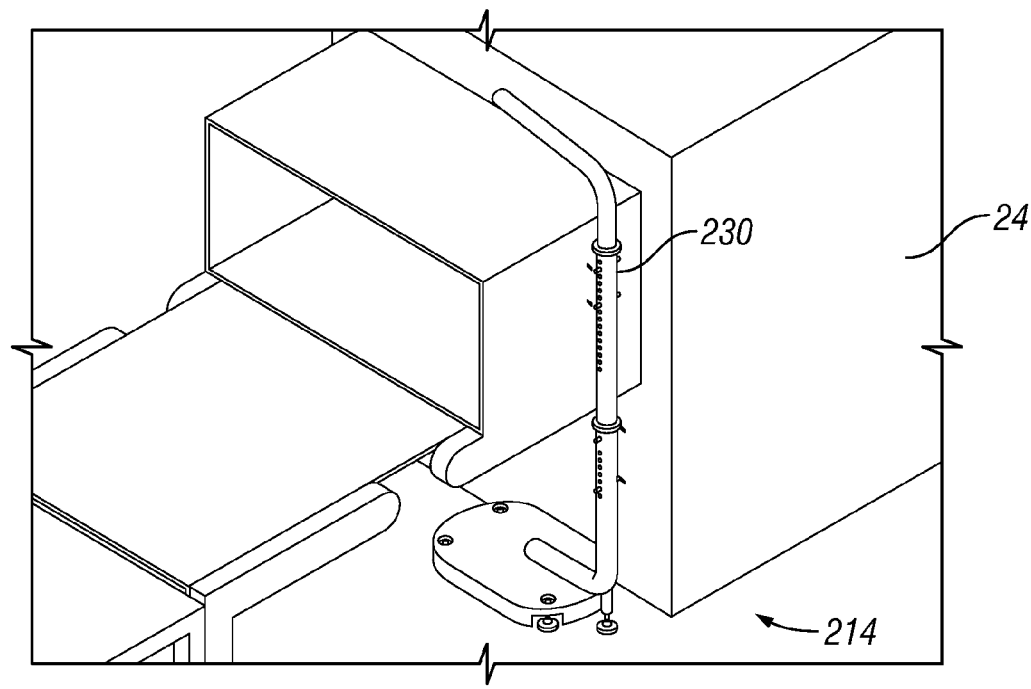
Figure 8D:
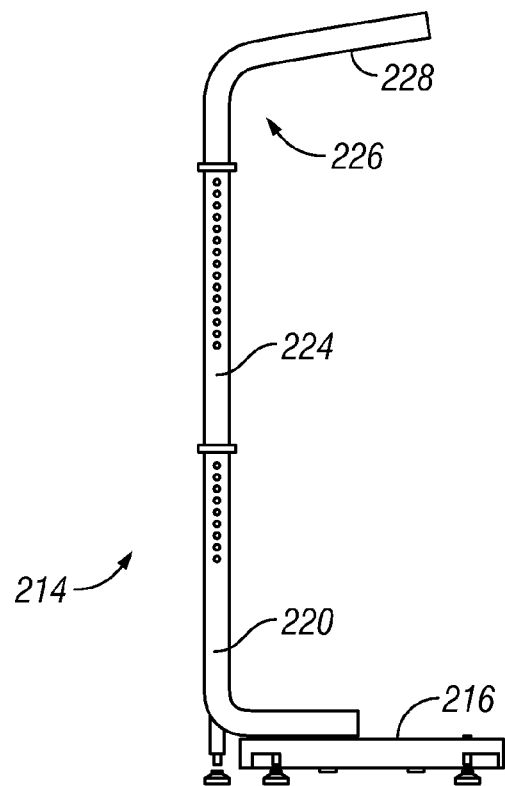
Figure 8E:
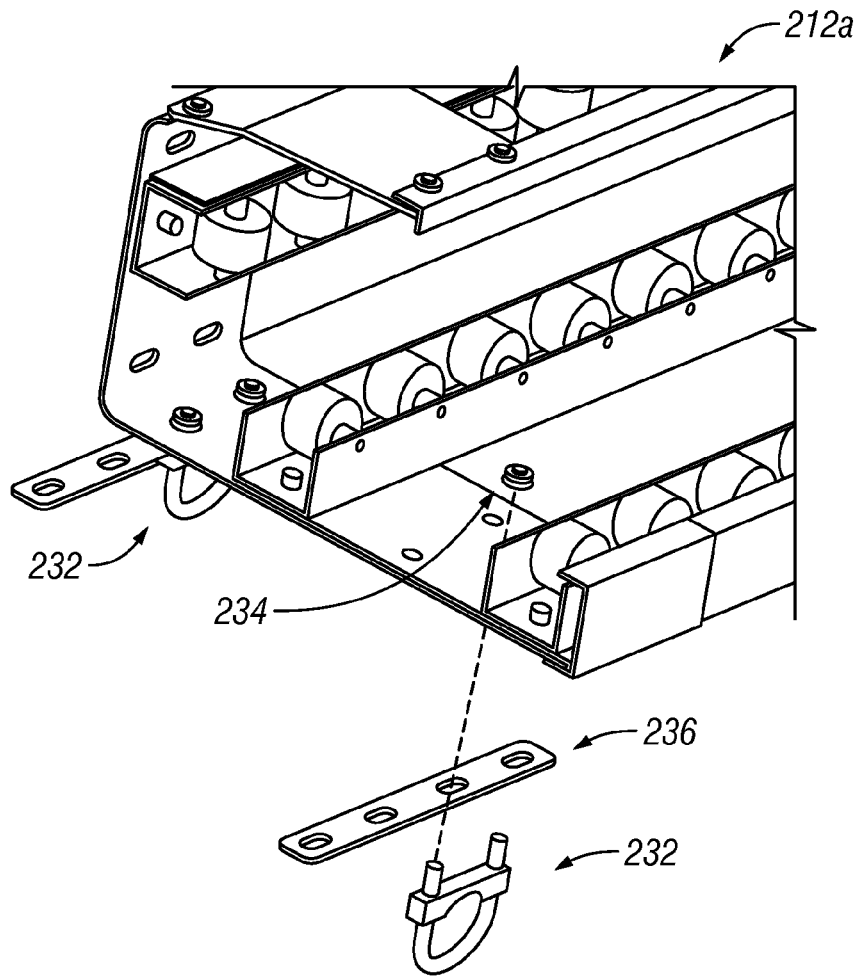
Figure 8F:
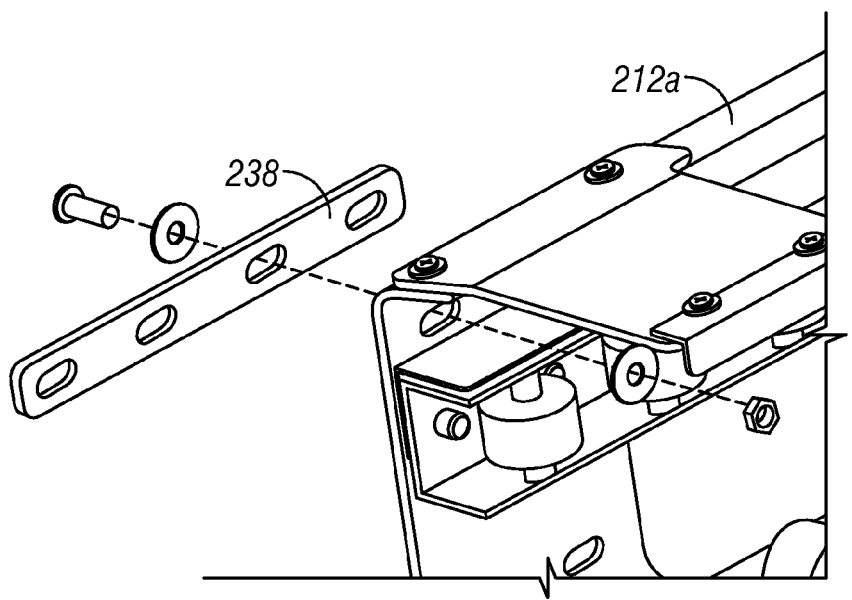
Figure 8G:
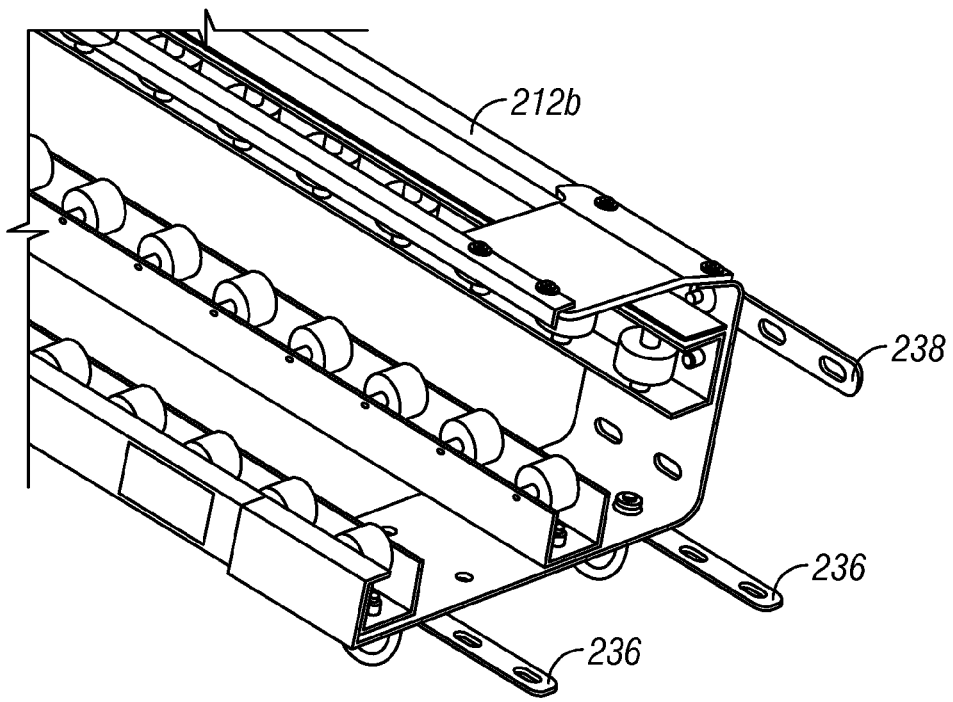
Figure 8H:
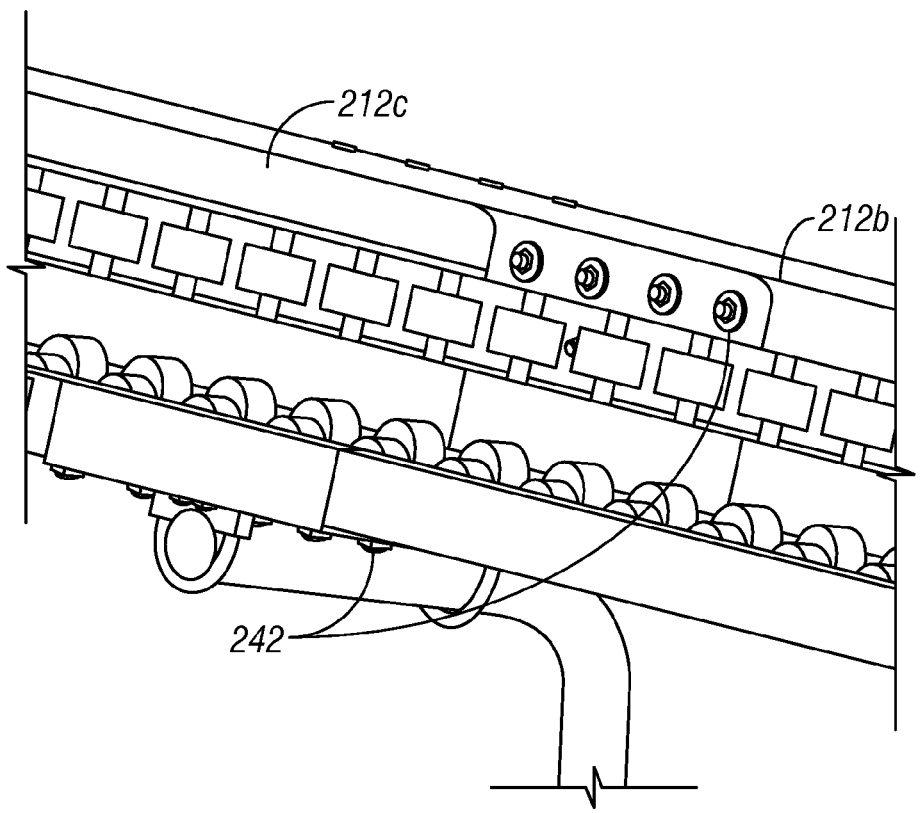
Figure 8I:
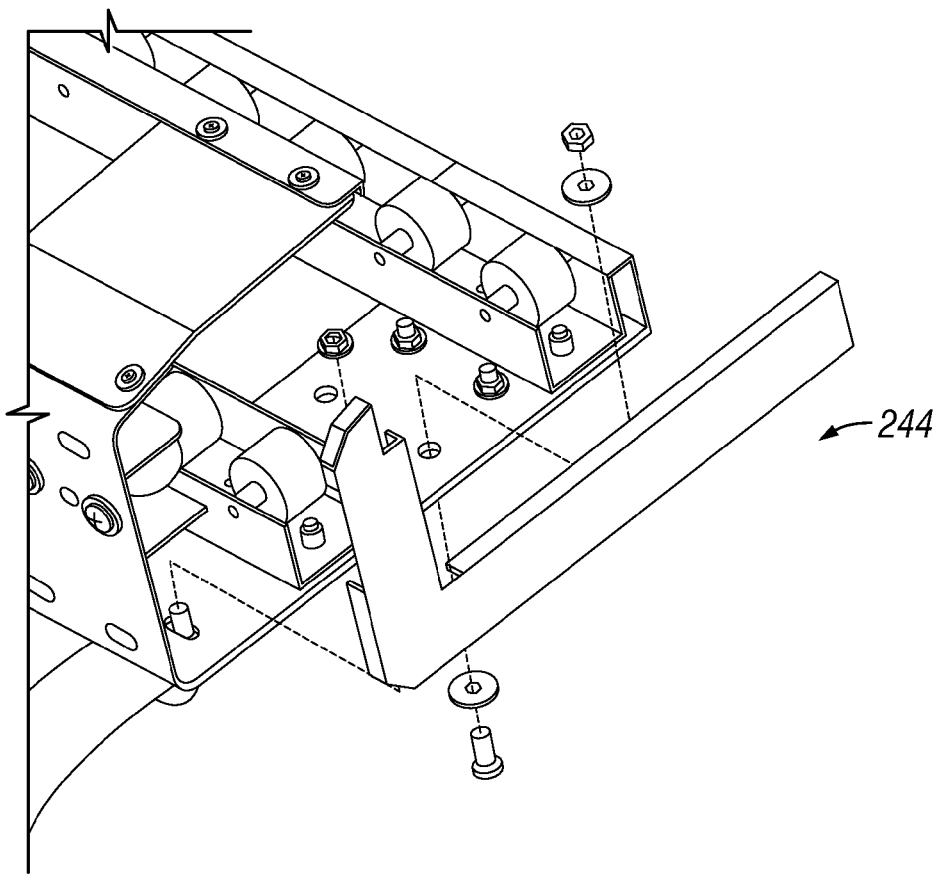
Figure 8J:
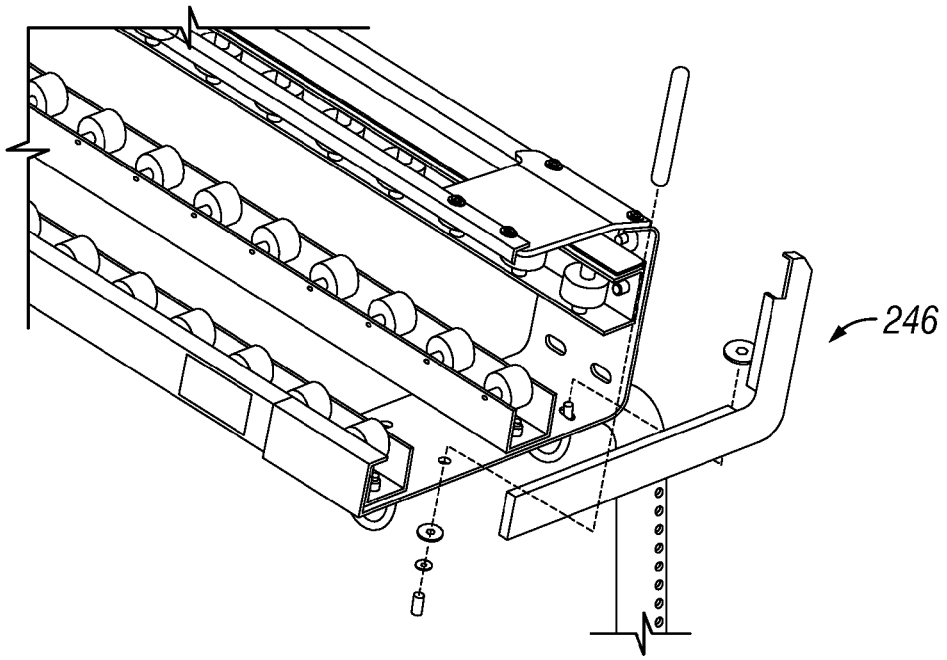
Figure 8K:
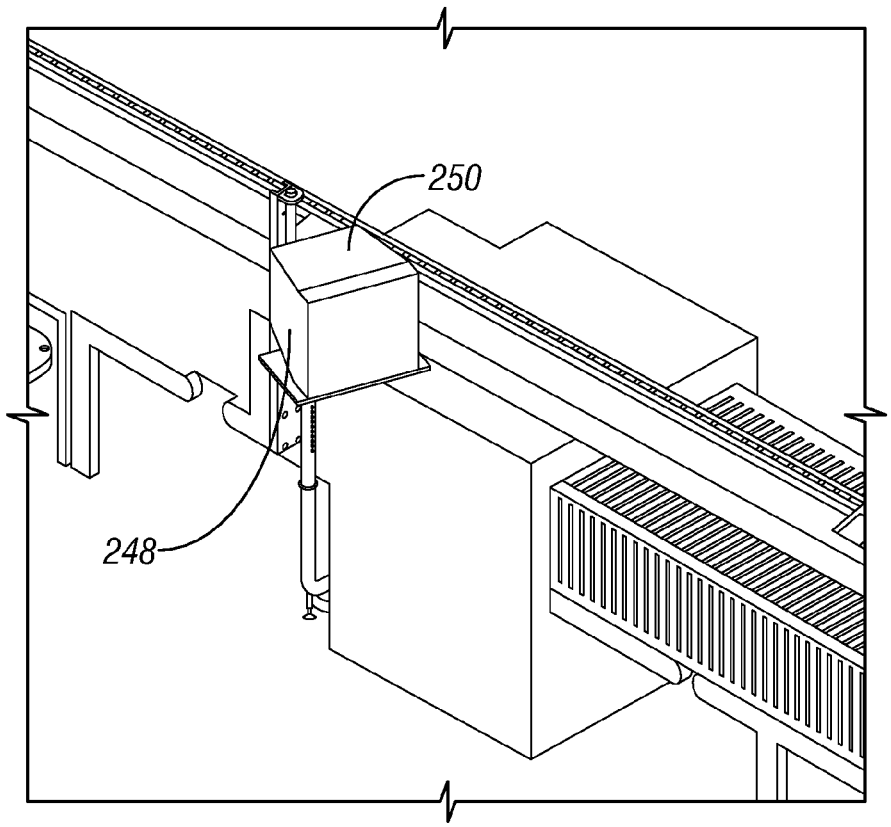
Figure 8L:
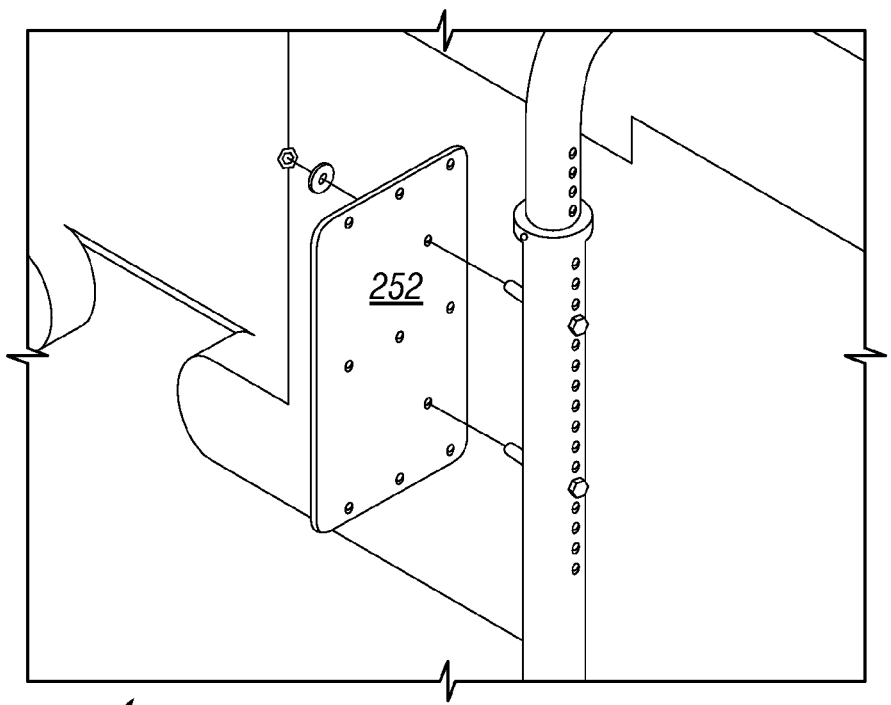
Figure 8M:
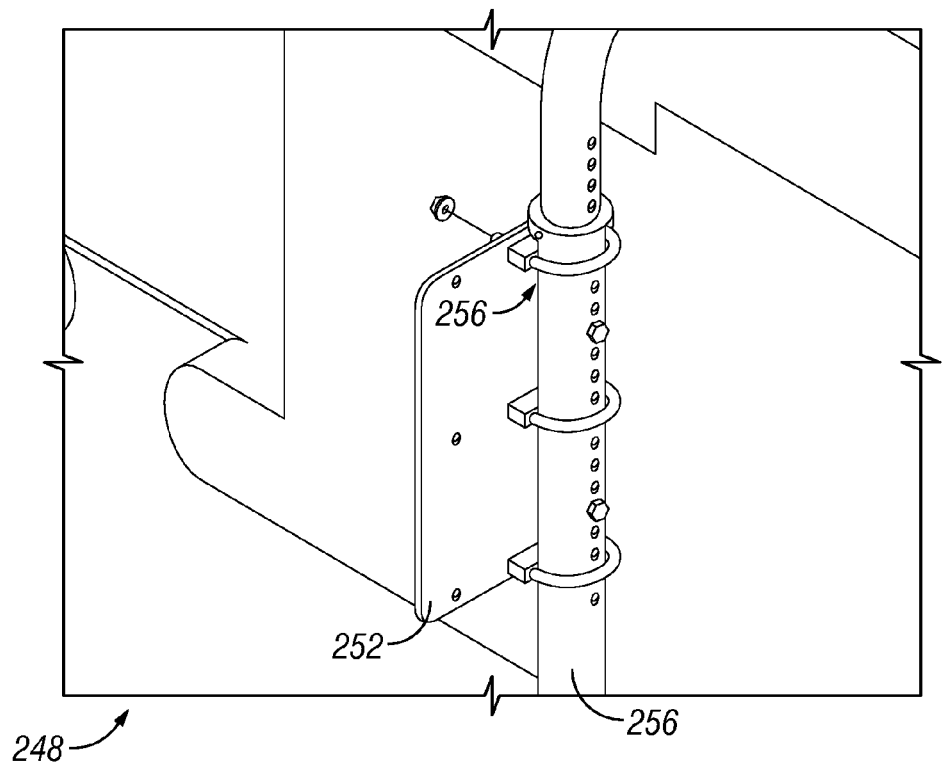
Figure 8N:
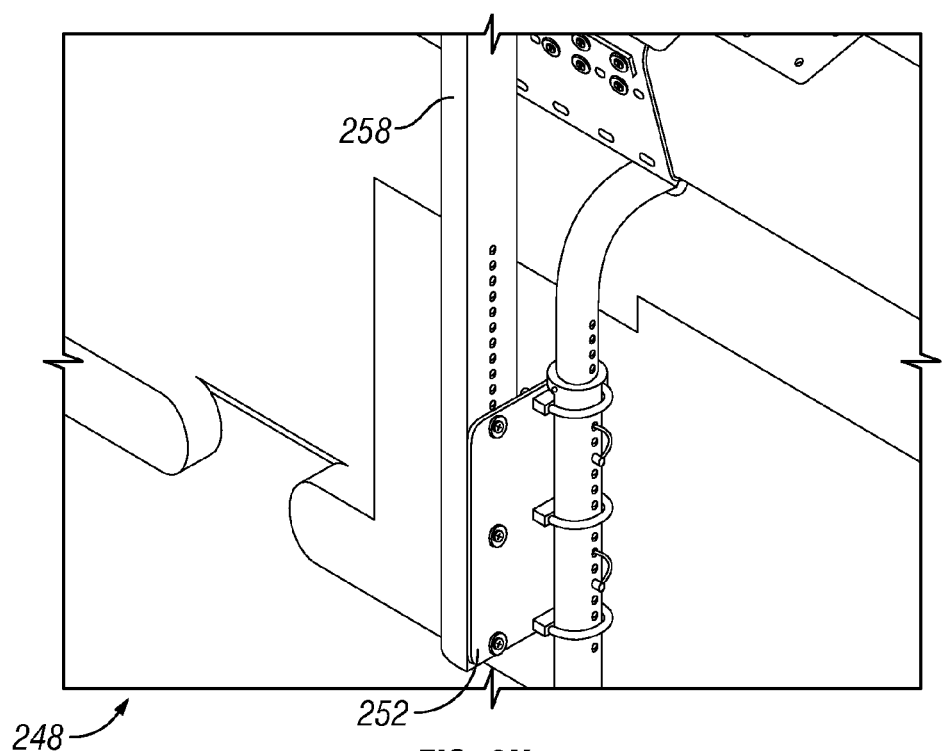
Figure 8O:
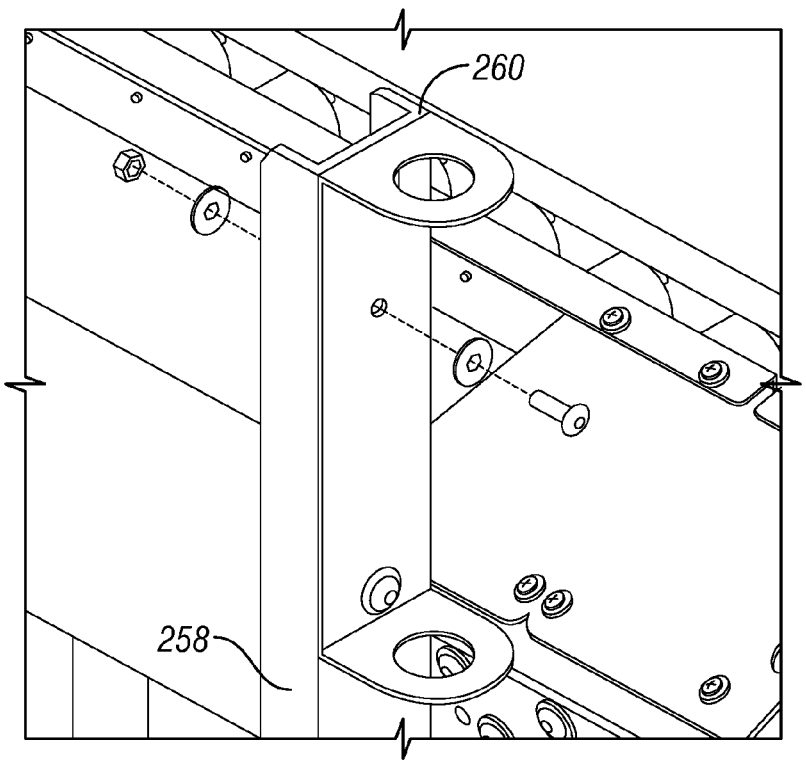
Figure 8P:
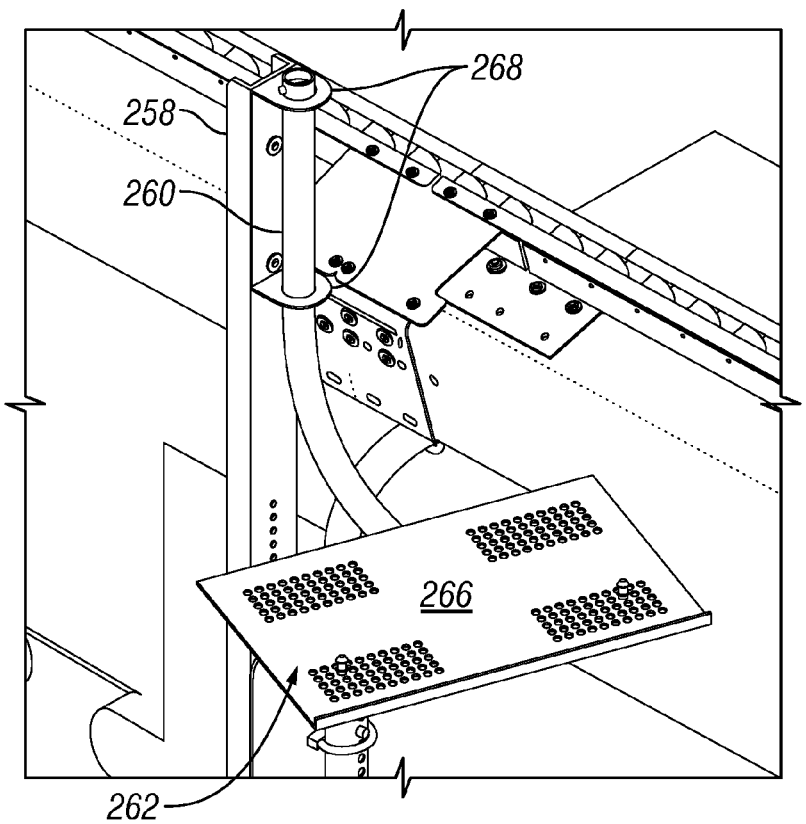
Figure 8Q:
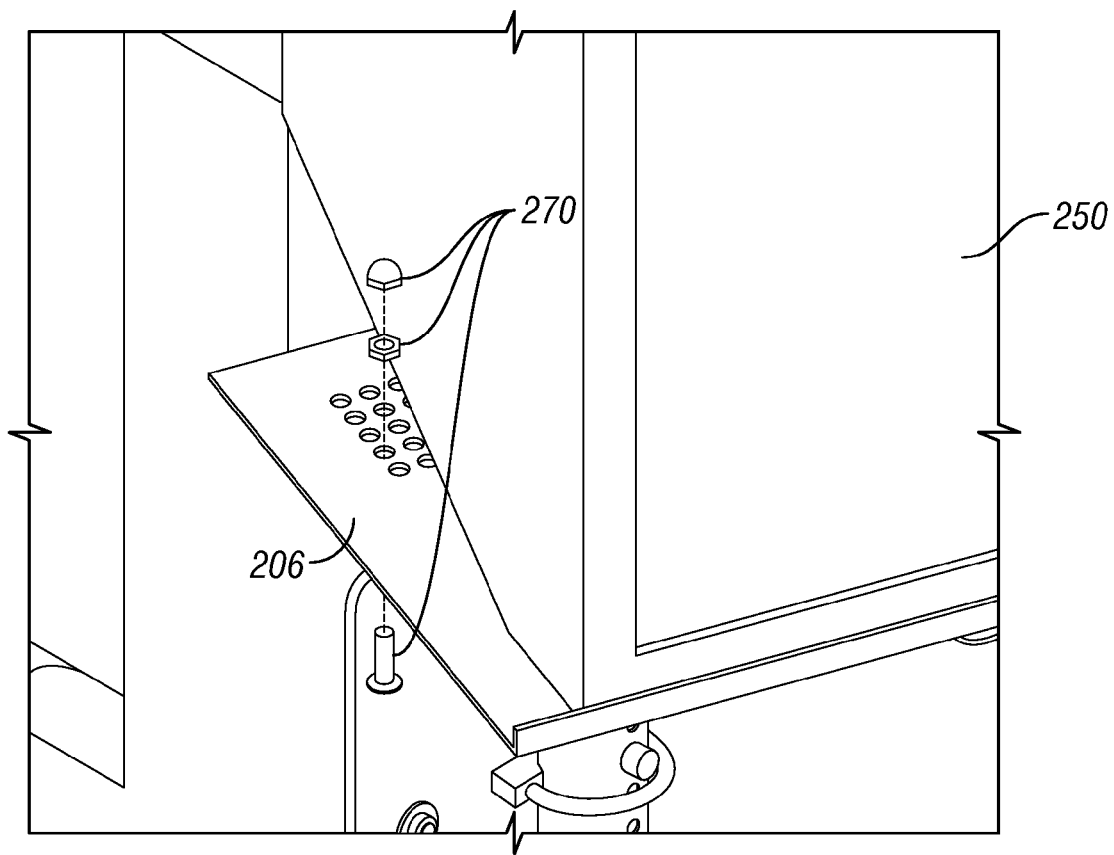

FIGS. 8A-8Q show an additional embodiment 20F of the bin transporter system. Because the general configuration of the bin transporter system 20F is similar to that of the bin transporter systems of FIGS. 6A-6L and 7A-7B, only highlights or differences are discussed here.

Turning first to FIG. 8A, the bin transporter system 20F includes four sections of roller system assembly 212a-212d, which are deployed end-on-end along one side of a conveyor system 24. The sections of roller system assembly are supported on stands 214, e.g., there are five stands 214 shown in FIG. 8A.

FIG. 8B shows the base 216 of the one of the stands 214. The base is oblong shaped, and includes four leveling feet 218. An additional leveling foot is attached to the lower leg 220 of the stand. Additionally, four casters 222 are integrated with the bottom of the stand base.

FIGS. 8C and 8D show the stand 214 in more detail. As indicated, the stand is generally C-shaped. The stand 214 includes the base 216, a generally L-shaped lower leg 220 attached to the base 216, an intermediate leg 224 slidably disposed within the lower leg 220, and a generally L-shaped upper leg 226, which includes a support arm portion 228, slidably disposed within the intermediate leg 224. The three leg portions 220, 224, 226 are telescopically arranged, so that the overall height of the stand may be adjusted. The stand includes leg engagement/locking mechanisms, as at 230 in FIG. 8C, for selectively maintaining the leg portions at a desired height.

FIG. 8E shows the end of one section of roller system assembly 212a. As indicated, the assembly includes U-clamps 232, attached to the long wall of the assembly by nuts 234, for attaching the assembly to a stand support arm portion 228. Also included are tie brackets 236 for attaching adjacent sections of roller system assembly to one another. As shown, the brackets 236 are disposed and held in place between the U-clamps and long wall.

FIG. 8F shows the manner in which an additional tie bracket 238 is attached to the top of the short wall portion of the assembly, using, e.g., a bolt, washers, and nut assembly 240.

FIG. 8G shows the tie brackets of the "right side" end of the middle section 212b of roller system assembly. FIG. 8H shows the other end (e.g., "left side" end) of the middle section 212b connected to the main section of roller system assembly 212c. Note that while the right side of the middle section has U-clamps and tie brackets, the left side end, as shown in FIG. 8H, does not. Instead, the left side end receives the tie brackets attached to the end of the main section 212c. The two sections are attached to one another using fasteners 242.

FIGS. 8I and 8J show alternative end cap units 244, 246 attached to the terminus ends of the bin transporter system, e.g., one is attached to the free end of the first end section 212a and the other end cap unit is attached to the free end of the second end section 212d.

Since the bin transporter system will typically be placed on the back side of the security checkpoint conveyor system, away from passenger corridors and metal detectors, it may be necessary to relocate the imaging device monitor and/or the station where the imaging device is operated. For this purpose, the system may include a mounting assembly 248, attached to the roller system assembly, support stands, or otherwise, for supporting an imaging device monitor 250 and/or other components such as keyboards and computer pointer devices. FIGS. 8K-8Q show one example of such an assembly 248. As shown in FIG. 8L, the assembly 248 includes a monitor mount support 252 attached to one of the support stands 214. The monitor mount support 252 is a generally rectangular plate, attached to the support stand using fastener assemblies 254, so as to lie generally parallel to the axis of the support stand (i.e., the support plate is generally vertically oriented). As shown in FIG. 8M, the monitor mount support 252 is further secured in place using U-clamp assemblies 256 that extend around the support stand and through apertures provided for that purpose in the monitor mount support 252. As shown in FIG. 8N, a monitor mount channel 258 is attached to the monitor mount support 252, so as to extend upwards generally vertically. The monitor mount channel is a generally elongate, U-shaped support member. As shown in FIG. 8O, a monitor mount bracket 260 is attached to the top end of the monitor mount channel 258. The bracket includes a base (which is attached to the monitor mount channel), and two generally parallel extension portions, each of which is provided with an aperture. As shown in FIG. 8P, a monitor mount post and table assembly 262 is attached to the monitor mount bracket 260. The monitor mount post and table assembly 262 includes a curved or bent arm portion 264 and a generally flat table portion 266 attached to the arm 264. The arm 264 is disposed through the two apertures of the monitor mount bracket 260, which vertically align. As indicated, the arm "hangs down" from the monitor mount bracket 260, so that the table portion 266 is generally parallel to the floor or other support surface. The arm 264 is secured in place using retaining elements, such as bolt/nut assemblies 268 located just above each extension portions of the monitor mount bracket 260. The bolt/nut assemblies are wider than the apertures, preventing the arm from falling through the apertures. However, the arm can still be rotated, for adjusting the position of the table. For use, a monitor 250 or other portion of the security imaging device is disposed on the table 266, and held in place using retaining elements 270 or the like attached to the table.

In addition to the selective mounting of the monitor 250, it will be readily appreciated that the bin transporter system of the present invention may mount additional devices adjacent the roller system assembly. In particular, and returning to FIG. 7A, it is envisioned that a counter mechanism 300 may also be mounted to the roller system assembly 200.

As shown in FIG. 7A, the counter mechanism 300 is mounted such that it will detect the number of individual bins 22 which pass by the monitor 300 in any given or predetermined time-period (hour/day/month etc.). The counter mechanism 300 may be an optical sensor, a mechanical sensor, or the like, provided that it is capable of determining the passage of individual bins 22 as they are transported by the counter mechanism 300. It will be readily appreciated that by tabulating the number of bins 22 which may be utilized at any given security location, this information can be utilized to reconfigure the number and spacing of security locations within a closed environment (such as an airport), and can also assist in determining the proper number of bins needed during specific times, and in specific locations, within the closed environment.

It is also possible to add a hinged or angled connection bracket to facilitate the addition of roller modules to the taller side of the system (the side where bins 22 are loaded), without increasing the height of the system. The hinged or angled bracket would transition the system from its inclined section to a horizontal section. The horizontal section would then require that the operator such the bins 22 along the horizontal position until the inclined portion is reached.

Unless otherwise specified, any of the aforementioned components of the bin transporter system may be made of aluminum, light-gauge sheet stainless steel, a polymer, or another strong, durable, relatively light weight material. In particular, since the system will typically be implemented in a modular fashion, both for quick set up in the field, and to accommodate different security checkpoint configurations/layouts, it is advantageous for even the largest modular components, e.g., the sections of roller system assembly, to be easily moved and repositioned by 2-3 security personnel. Additionally, unless otherwise specified, the components can be manufactured for unitary construction, e.g., through extrusion, molding, or the like, or the components can be assembled from various sub-components connected to one another using standard connection means.

Although the bin transporter system has been primarily illustrated as using wheel-type roller units for moving bins along the roller support bin guide, any roller conveyor could be used without departing from the spirit and scope of the invention. As mentioned above, possibilities include wheel rollers, cylindrical rollers, ball- or sphere-type rollers or conveyors, miniature wheel-type rollers (i.e., skate wheel conveyors), and the like.

Since certain changes may be made in the above-described bin transporter system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:
1. A bin transporter system comprising:
a roller assembly comprising an elongate bin guide and at least first and second roller conveyors attached to the inside of the bin guide, said first and second roller conveyors being cooperatively positioned for facilitating movement of a bin along the bin guide;

wherein the bin guide is attached to at least one support for supporting the bin guide in a longitudinally inclined orientation, for gravity-actuated movement of the bin along the bin guide; and wherein the roller assembly positions the bin at a laterally tilted orientation, with respect to a horizontal support surface underlying the roller assembly, when the bin is placed in the bin guide against the roller conveyors for movement along the bin guide.

2. The bin transporter system of claim 1, wherein:

the at least one support comprises a plurality of free-standing support stands, said roller assembly being supported by and extending between the support stands.

3. The bin transporter system of claim 2, wherein:

the support stands each include a base, a generally vertical leg portion attached to the base and adjustable in height, and a support arm attached to the leg portion opposite the base; and the bin guide is attached to and supported by the support arms, said support arms being angled upwards off of perpendicular with respect to the leg portions for laterally tilting the bin guide and thereby bins held in the bin guide.

4. The bin transporter system of claim 3, wherein:

the roller assembly is reversible on the support arms, for positioning at a selected one of a first position of the roller assembly against the support arms and a second position of the roller assembly against the support arms;

in the first position, a bin located in the bin guide and positioned against the roller conveyors for movement along the bin guide is laterally titled in a generally horizontal orientation; and in the second position, a bin located in the bin guide and positioned against the roller conveyors for movement along the bin guide is laterally titled in a generally vertical orientation.

5. The bin transporter system of claim 2, wherein:

the roller assembly is reversible on the support stands, for positioning at a selected one of a first position of the roller assembly against the support stands and a second position of the roller assembly against the support stands;

in the first position, a bin located in the bin guide and positioned against the roller conveyors for movement along the bin guide is laterally titled in a generally horizontal orientation; and in the second position, a bin located in the bin guide and positioned against the roller conveyors for movement along the bin guide is laterally titled in a generally vertical orientation.

6. The bin transporter system of claim 2, wherein:

each free-standing support stand includes a base portion positioned against a floor or other support surface, and a leg attached to the base portion and extending upwards therefrom, said leg being adjustable in height, and said base portion having a plurality of adjustable leveling feet for interfacing the base with uneven portions of the floor or other support surface.

7. The bin transporter system of claim 1, wherein:

the bin guide includes a bottom wall, a front wall, and a rear wall, said front and rear walls being attached to the bottom wall, said first roller conveyor being attached to the bottom wall inside the bin guide, and said second roller conveyor being attached to the rear wall inside the bin guide; and a front of the bin guide is substantially open, as defined by a height of the rear wall being greater than a height of the front wall, whereby bins are more easily placed in and removed from the bin guide.

8. The bin transporter system of claim 7 wherein the rear wall of the bin guide is attached to a first long edge of the bottom wall, and the front wall of the bin guide is attached to a second long edge of the bottom wall, on the same side of the bottom wall as the rear wall, said first and second long edges of the bottom wall being generally parallel to one another.

9. The bin transporter system of claim 7 wherein a rolling axis of the first roller conveyor is angled off of parallel with the bottom wall of the bin guide, by a first non-zero degree angle, for bins to lie laterally tilted when placed in the bin guide against the roller conveyors for movement along the bin guide.

10. The bin transporter system of claim 7 wherein a rolling axis of the second roller conveyor is angled off of parallel with the rear wall of the bin guide, by a second non-zero degree angle, for bins to lie laterally tilted when placed in the bin guide against the roller conveyors for movement along the bin guide.

11. The bin transporter system of claim 10 wherein the first and second angles are each between about 4 degrees and about 20 degrees.

12. The bin transporter system of claim 1 further comprising:

a support channel assembly attached to and underlying the roller assembly for supporting the roller assembly, said support channel being attached to and extending along the side of a security checkpoint conveyor system, for use of the bin transporter system in moving bins from an exit end of the conveyor system to an entrance end of the conveyor system.

13. The bin transporter system of claim 12 further comprising:

a plurality of support members respectively attached to a plurality of vertical legs or other supports of the security checkpoint conveyor system, each of said support members presenting a side surface that is generally coplanar with the side surfaces of the other support members, and said support channel being attached to the side surfaces of the support members and extending therebetween.

14. The bin transporter system of claim 1 wherein the laterally tilted orientation of a bin in the bin guide is defined by a flat bottom wall of the bin lying at a non-zero angle to an axis perpendicular to the horizontal support surface that underlies the roller assembly, when the bin is placed in the bin guide against the roller conveyors for movement along the bin guide.

15. A bin transporter system comprising:

a plurality of free-standing support stands, each of said stands having a base positioned against a floor or other support surface and a leg attached to the base, said leg extending upwards from the base and being adjustable in height; and a first roller assembly comprising an elongate bin guide and at least one roller conveyor attached to the inside of the bin guide, said at least one roller conveyor being positioned for facilitating movement of a bin along the bin guide;

wherein the bin guide is attached to and disposed between the support stands in a longitudinally inclined orientation, for gravity-actuated movement of the bin along the bin guide.

16. The bin transporter system of claim 15, wherein:

the roller assembly includes first and second roller conveyors attached to the inside of the bin guide, said first and second roller conveyors being cooperatively positioned for facilitating movement of a bin along the bin guide; and the roller assembly positions the bin at a laterally tilted orientation, with respect to the floor or other support surface, when the bin is placed in the bin guide against the roller conveyors for movement along the bin guide.

17. The bin transporter system of claim 16, wherein:

the roller assembly is reversible on the support stands, for positioning at a selected one of a first position of the roller assembly against the support stands and a second position of the roller assembly against the support stands;

in the first position, a bin located in the bin guide and positioned against the roller conveyors for movement along the bin guide is laterally titled in a generally horizontal orientation of the bin; and in the second position, a bin located in the bin guide and positioned against the roller conveyors for movement along the bin guide is laterally titled in a generally vertical orientation of the bin.

18. The bin transporter system of claim 15, wherein:

each support stand base includes a plurality of adjustable leveling feet for interfacing the base with uneven portions of the floor or other support surface.

19. A bin transporter system comprising:

a plurality of free-standing support stands each positioned against a floor or other support surface; and first and second sections of roller assembly each comprising an elongate bin guide and at least one roller conveyor attached to the inside of the bin guide, said at least one roller conveyor being positioned for facilitating movement of a bin along the bin guide; wherein:

the bin guide of the first section of roller assembly is attached to and disposed between a first two of said support stands in a longitudinally inclined orientation, for gravity-actuated movement of the bin along the bin guide of the first section of roller assembly;

the bin guide of the second section of roller assembly is attached to and disposed between a second two of said support stands in a longitudinally inclined orientation, for gravity-actuated movement of the bin along the bin guide of the second section of roller assembly;

the first and second sections of roller assembly are longitudinally aligned with, and spaced apart from, each other; and the system further comprises an extension section of roller assembly attached to and extending between the first and second sections of roller assembly, said extension section bridging the longitudinal space between the first and second sections of roller assembly, wherein the extension section is supported only by the first and second sections of roller assembly and is detachable and removable therefrom for placement of a security barrier between the first and second sections of roller assembly.

20. The bin transporter system of claim 19, wherein:

each of the first section of roller assembly, second section of roller assembly, and extension section of roller assembly is configured to position a bin therein at a laterally tilted orientation, with respect to the floor or other support surface, when the bin is positioned against the at least one roller conveyor for movement along the bin guide.

\* \* \* \* \*